US012595120B2

(12) United States Patent
Liu et al.

(10) Patent No.: US 12,595,120 B2
(45) Date of Patent: Apr. 7, 2026

(54) ENERGY RECOVERY IN STOCKING VEHICLES

(71) Applicant: Taiwan Semiconductor Manufacturing Company Limited, Hsin-Chu (TW)

(72) Inventors: Chun Cheng Liu, Changhua County (TW); Guancyun Li, Hsinchu City (TW); Ching-Jung Chang, Taichung City (TW); Yi-Ching Lo, Hsinchu County (TW)

(73) Assignee: Taiwan Semiconductor Manufacturing Company Limited, Hsin-Chu (TW)

( * ) Notice: Subject to any disclaimer, the term of this patent is extended or adjusted under 35 U.S.C. 154(b) by 224 days.

(21) Appl. No.: 18/377,977

(22) Filed: Oct. 9, 2023

(65) Prior Publication Data

US 2025/0115425 A1 Apr. 10, 2025

(51) Int. Cl.
| | |
|---|---|
| *H02P 3/18* | (2006.01) |
| *B60L 7/14* | (2006.01) |
| *B65G 1/04* | (2006.01) |

(52) U.S. Cl.
CPC .............. *B65G 1/0414* (2013.01); *B60L 7/14* (2013.01); *B60L 2200/44* (2013.01); *B65G 2201/0297* (2013.01)

(58) Field of Classification Search
CPC . H02P 5/74; G05B 19/41895; G05B 19/4182; G05B 19/4189; G05B 19/39102; G05B 19/39106; G05B 19/39107; G05B 19/50393; G05B 19/45083
See application file for complete search history.

(56) References Cited

U.S. PATENT DOCUMENTS

2022/0348405 A1* 11/2022 Cheng ...................... B25J 13/08

FOREIGN PATENT DOCUMENTS

| | | | | |
|---|---|---|---|---|
| CN | 101462633 A * | 6/2009 | .......... | B65G 1/0421 |
| JP | 2017199817 A * | 11/2017 | | |
| WO | WO-2019198160 A1 * | 10/2019 | .............. | H02P 27/04 |

* cited by examiner

*Primary Examiner* — Karen Masih
(74) *Attorney, Agent, or Firm* — Cooper Legal Group, LLC

(57) ABSTRACT

A stocking vehicle is provided. The stocking vehicle is configured to perform a stocking operation to transfer a first product unit from a first location to a second location. The stocking vehicle includes a stocking component. The stocking vehicle includes a motor coupled to the stocking component to facilitate performance of the stocking operation by the stocking component. The stocking vehicle includes an energy storage device configured to supply first energy to the motor during a first state of the motor and store second energy of the motor during a second state of the motor.

20 Claims, 26 Drawing Sheets

PERFORM STOCKING OPERATION TO TRANSFER FIRST PRODUCT UNIT USING STOCKING COMPONENT ⟍ 2102

DURING FIRST STATE OF MOTOR, WHILE PERFORMING STOCKING OPERATION, SUPPLY FIRST ENERGY TO MOTOR USING ENERGY STORAGE DEVICE ⟍ 2104

DURING SECOND STATE OF MOTOR, WHILE PERFORMING STOCKING OPERATION, STORE SECOND ENERGY OF MOTOR IN ENERGY STORAGE DEVICE ⟍ 2106

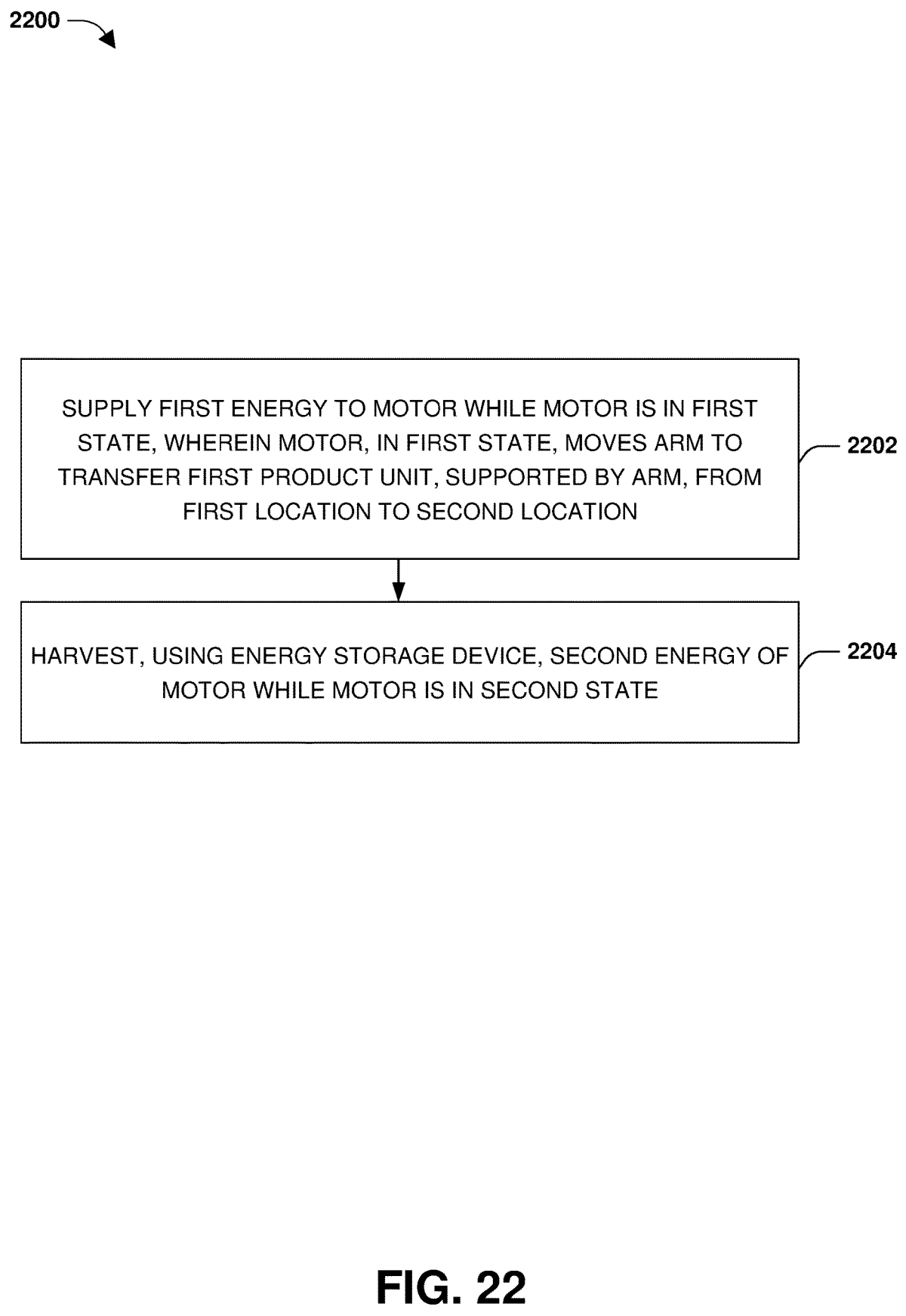

2200 ⟍

SUPPLY FIRST ENERGY TO MOTOR WHILE MOTOR IS IN FIRST STATE, WHEREIN MOTOR, IN FIRST STATE, MOVES ARM TO TRANSFER FIRST PRODUCT UNIT, SUPPORTED BY ARM, FROM FIRST LOCATION TO SECOND LOCATION ⟋— 2202

HARVEST, USING ENERGY STORAGE DEVICE, SECOND ENERGY OF MOTOR WHILE MOTOR IS IN SECOND STATE ⟋— 2204

FIG. 22

ENERGY RECOVERY IN STOCKING VEHICLES

BACKGROUND

Semiconductor devices are formed on, in, and/or from semiconductor wafers, and are used in a multitude of electronic devices, such as mobile phones, laptops, desktops, tablets, watches, gaming systems, and various other industrial, commercial, and consumer electronics. One or more semiconductor fabrication processes are performed to form semiconductor devices on, in, and/or from a semiconductor wafer. The semiconductor wafer is stored in a wafer storage device during a period between semiconductor fabrication processes.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 18 illustrates a side view of a storage assembly, a crane, and an arm, in accordance with some embodiments.

FIG. 22 is a flow diagram illustrating a method, in accordance with some embodiments.

DETAILED DESCRIPTION

Figure 1:
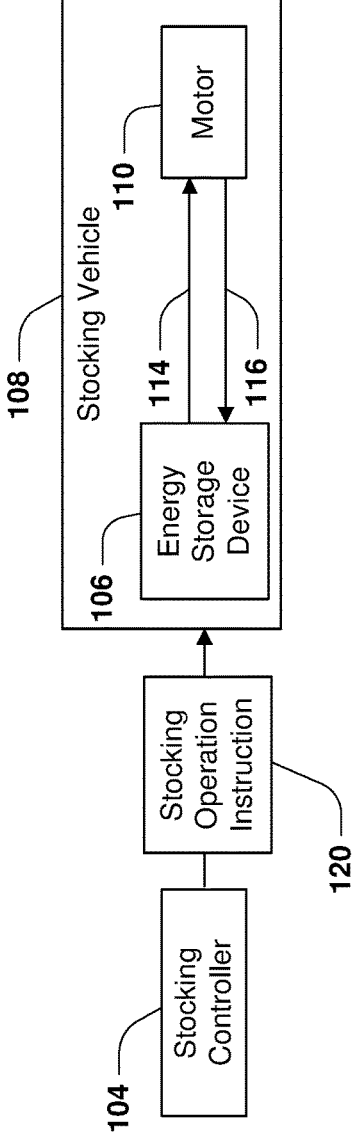
FIG. 1 illustrates a component block diagram of a stocking controller and a stocking vehicle, in accordance with some embodiments.
Figure 1:

The following disclosure provides several different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals or letters in the various examples. This repetition is for the purpose of simplicity and clarity and does not in itself dictate a relationship between the various embodiments or configurations discussed.

Further, spatially relative terms, such as "beneath," "below," "lower," "above," "upper" and the like, may be used herein for ease of description to describe one element or feature's relationship to other element(s) or feature(s) as illustrated in the figures. The spatially relative terms are intended to encompass different orientations of the device in use or operation in addition to the orientation illustrated in the figures. The apparatus may be otherwise oriented (rotated 90 degrees or at other orientations) and the spatially relative descriptors used herein may likewise be interpreted accordingly.

According to some embodiments, an automated material handling system uses a stocking vehicle to perform stocking operations of product units, such as wafer storage devices. The stocking vehicle comprises an energy storage device used to harvest energy from a motor of the stocking vehicle. In some embodiments, the motor is decelerated via regenerative braking to harvest the energy from the motor. The energy storage device stores the energy for later use, thereby providing for reduced energy consumption and/or improved energy efficiency of the stocking vehicle. In some embodiments, by reducing the power consumption of the stocking vehicle, a power source of the automated material handling system can concurrently power a greater quantity of stocking vehicles at a given time without reaching a power limitation of the power source, thereby providing for stocking operations being performed with increased speed as a result of more stocking vehicles being powered and/or available for use.

FIGS. 1-20 illustrates aspects associated with an automated material handling system 100 for transporting and/or storing product units according to some embodiments. In some embodiments, the automated material handling system 100 comprises at least one of a stocking vehicle 108, or a stocking controller 104. In some embodiments, the stocking vehicle 108 comprises at least one of a transport vehicle, an overhead transport vehicle, a guided transport vehicle that travels on predetermined routes or tracks, a forklift, or other suitable vehicle. In some embodiments, the stocking controller 104 controls one or more stocking vehicles, such as the stocking vehicle 108, of the automated material handling system 100 to facilitate one or more stocking operations. In some embodiments, the stocking vehicle 108 performs a first stocking operation of a first product unit. In some embodiments, the first stocking operation comprises transferring the first product unit from a first location to a second location.

In some embodiments, the first product unit comprises a wafer storage device. In some embodiments, the wafer storage device comprises at least one of a front opening unified pod (FOUP), a cassette pod, a reticle pod, or other type of wafer storage device. In some embodiments, the wafer storage device is used to store one or more wafers. In some embodiments, the one or more wafers comprise a batch of wafers. In some embodiments, the one or more wafers comprise at least one of one or more semiconductor wafers, one or more photomasks, one or more semiconductor devices, one or more dies, etc. In some embodiments, the one or more wafers are stacked vertically in the wafer storage device. In some embodiments, the one or more wafers are supported by a support frame, of the wafer storage device, having at least one of wafer shelves or wafer slots. In some embodiments, a wafer stored in the wafer storage device comprises one or more layers, such as at least one of a semiconductor layer, a conductor layer, or an insulator layer.

In some embodiments, the first location or the second location corresponds to a location of a load port of a process machine (not shown). In some embodiments, the process machine comprises at least one of (i) physical vapor deposition (PVD) equipment, (ii) chemical vapor deposition (CVD) equipment, (iii) plating equipment, (iv) etching equipment, such as at least one of plasma etching equipment, wet etching equipment, dry etching equipment, reactive-ion etching (RIE) equipment, atomic layer etching (ALE) equipment, buffered oxide etching equipment, or ion beam milling equipment, (v) lithography equipment, (vi) chemical mechanical planarization (CMP) equipment, or (vii) other equipment.

In some embodiments, the process machine is used to perform a first process, such as a semiconductor fabrication process, on the one or more wafers stored in the first product unit, such as the wafer storage device. In some embodiments, the first process comprises at least one of (i) a PVD process, (ii) a CVD process, (iii) a plating process, (iv) an etching process, such as at least one of a plasma etching process, a wet etching process or a dry etching process, (v) a lithographic equipment, (vi) a CMP process, or (vii) one or more other suitable processes. In some embodiments, when the first product unit is docked onto the load port, a wafer stored in the first product unit is unloaded from the first product unit and inserted into the process machine. In some embodiments, after inserting the wafer into the process machine, the process machine is used to perform the first process on the wafer. In some embodiments, in response to completing the first process on the wafer, the wafer is removed from the process machine and loaded into the first product unit, such as the wafer storage device. In some embodiments, multiple wafers are processed using the process machine at a time. In some embodiments, a single wafer is processed using the process machine at a time. In some embodiments, the process machine is used to perform the first process on each wafer of one, some or all wafers stored in the first product unit to produce a set of one or more processed wafers, and the set of one or more processed wafers are loaded into the first product unit.

In some embodiments, the first location corresponds to the location of the load port of the process machine. In some embodiments, the first stocking operation is performed in response to completion of the first process.

In some embodiments, the second location corresponds to the location of the load port of the process machine. In some embodiments, the first process is performed in response to performing the first stocking operation to transfer the first product unit to the load port of the process machine.

FIG. 1 illustrates the stocking controller 104 and the stocking vehicle 108, according to some embodiments. In some embodiments, the stocking controller 104 communicates with the stocking vehicle 108. In some embodiments, the stocking controller 104 transmits an instruction 120 to perform the first stocking operation to the stocking vehicle 108. In some embodiments, at least one of the stocking controller 104 transmits the instruction 120 to the first product unit or the stocking vehicle 108 performs the first stocking operation in response to the first product unit becoming available for transport. In some embodiments, at least one of the stocking controller 104 transmits the instruction 120 to the first product unit or the stocking vehicle 108 performs the first stocking operation in response to the first product unit arriving at the first location. In some embodiments, the first product unit is transported to the first location by a vehicle, different than the stocking vehicle 108, of the automated material handling system 100. In some embodiments, the instruction 120 is indicative of at least one of the first location, the second location, or other suitable information associated with the first stocking operation.

In some embodiments, the stocking vehicle 108 comprises an energy storage device 106 and a first motor 110. In some embodiments, the first motor 110 is used to facilitate performance of the first stocking operation. In some embodiments, the first motor 110 is coupled to a first stocking component of the stocking vehicle 108 to facilitate performance of the first stocking operation by the first stocking component. In some embodiments, the first motor 110 controls a position of the first stocking component. The first motor 110 comprises at least one of an electrical motor or other suitable motor.

In some embodiments, the energy storage device 106 supplies first energy 114 to the first motor 110 while the first motor 110 is in a first state. In some embodiments, the energy storage device 106 harvests second energy 116 from the first motor 110 while the first motor 110 is in a second state. In some embodiments, the second energy 116 comprises energy recovered via an energy recovery function of the stocking vehicle 108, such as kinetic energy recovery. In some embodiments, the stocking vehicle 108 comprises a kinetic energy recovery system (KERS) used to harvest the second energy 116.

In some embodiments, the first state corresponds to an energy consumption state during which the first motor 110 consumes energy supplied by the energy storage device 106. In some embodiments, the first motor 110 accelerates while the first motor 110 is in the first state. In some embodiments, the first state corresponds to an acceleration state during which the first motor 110 accelerates.

In some embodiments, the second state corresponds to an energy recovery state during which the first motor 110 generates energy for storage by the energy storage device 106. In some embodiments, the first motor 110 decelerates while the first motor 110 is in the second state. In some embodiments, the second state corresponds to a deceleration state during which the first motor 110 decelerates. In some embodiments, the second energy 116 is harvested via regenerative braking. In some embodiments, kinetic energy of the first motor 110 is converted to the second energy 116 to reduce a speed of the first motor 110. In some embodiments, the speed of the first motor 110 corresponds to a speed at which a shaft of the first motor 110 rotates. In some embodiments, when the first motor 110 is in the second state, the first motor 110 functions as an electric generator.

In some embodiments, the energy storage device 106 comprises at least one of one or more batteries, one or more capacitors, one or more electrostatic double-layer capacitors, one or more springs, a compressed gas energy storage device, one or more belts, a rotating flywheel, or one or more other suitable energy storage components. In some embodiments, the energy storage device 106 stores the second energy 116 at least one of chemically, electrically, or mechanically. In some embodiments, the energy storage device 106 is configured to at least one of electrically store or chemically store the second energy 116 using at least one of one or more batteries, one or more capacitors, one or more electrostatic double-layer capacitors, or one or more other suitable energy storage components. In some embodiments, the energy storage device 106 is configured to mechanically store the second energy 116 using at least one of one or more springs, compressed gas, one or more belts, a rotating flywheel, or one or more other suitable mechanical energy storage components.

Figure 2:
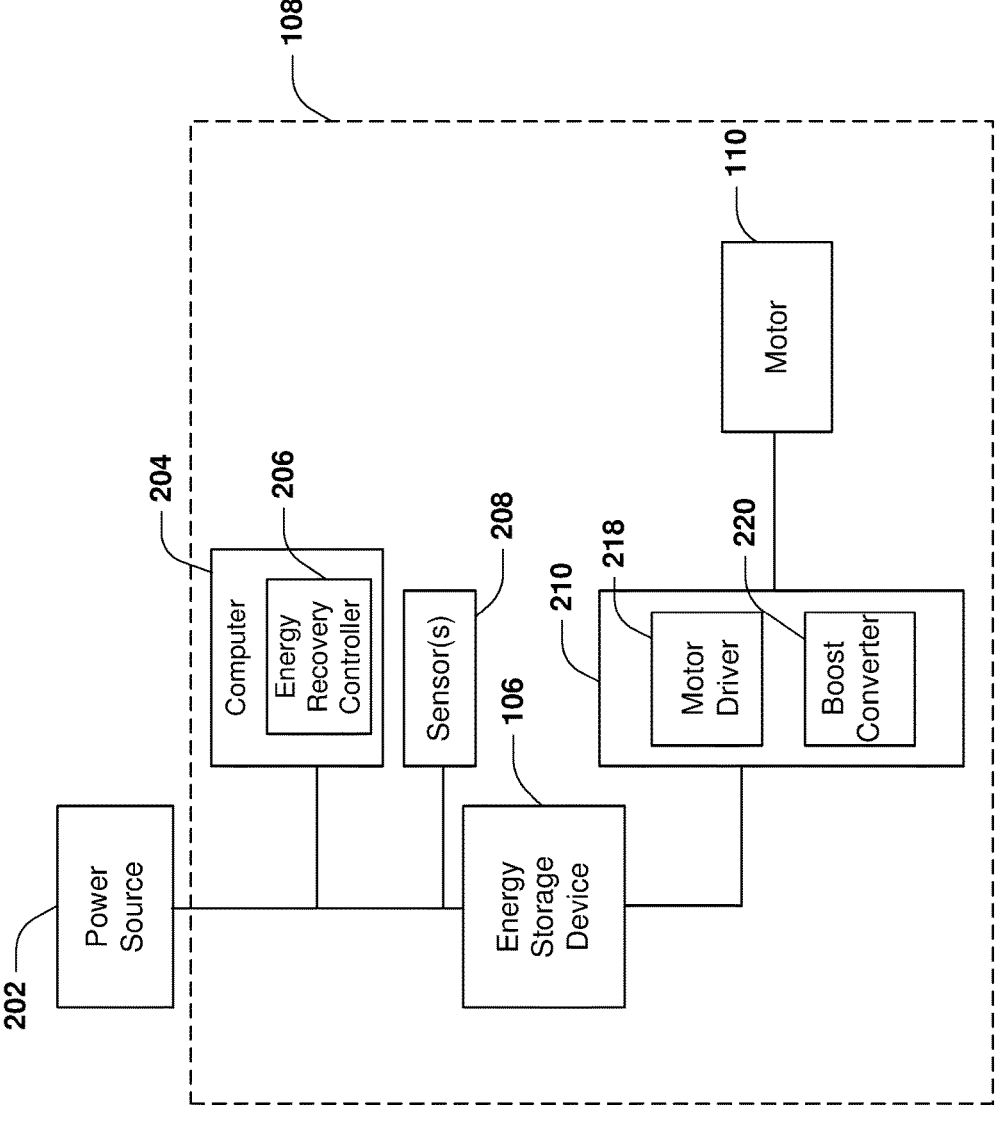
FIG. 2 illustrates a component block diagram of a stocking vehicle, in accordance with some embodiments.

FIG. 2 illustrates the stocking vehicle 108, according to some embodiments. In some embodiments, the stocking vehicle 108 comprises at least one of a computer 204, one or more sensors 208, or a motor control module 210. In some embodiments, the stocking vehicle 108 is connected to a power source 202, such as an external power source outside the stocking vehicle 108. In some embodiments, the power source 202 powers at least one of the computer 204, the one or more sensors 208, or the energy storage device 106. In some embodiments, the power source 202 is an electrical power source configured to supply electrical energy to at least one of the computer 204, the one or more sensors 208, or the energy storage device 106. In some embodiments, the energy storage device 106 stores energy supplied by the power source 202.

In some embodiments, the computer 204 comprises an energy recovery controller 206, such as a KERS controller. In some embodiments, at least one of the computer 204 or the energy recovery controller 206 controls the energy storage device 106 to at least one of (i) supply energy to the first motor 110 while the first motor 110 is in the first state, or (ii) harvest energy from the first motor 110 while the first motor 110 is in the second state. In some embodiments, the energy recovery controller 206 comprises at least one of hardware, software, or one or more other suitable components.

In some embodiments, the one or more sensors 208 comprise at least one of an image sensor, a proximal sensor, a location sensor, or one or more other suitable sensors. In some embodiments, information comprising at least one of one or more measurements, one or more images, etc. is determined using the one or more sensors 208. In some embodiments, the information is used to control the stocking vehicle 108 to perform the first stocking operation. In some embodiments, the first motor 110 is operated, based upon the information, using at least one of the energy storage device 106 or the motor control module 210.

In some embodiments, the motor control module 210 is configured to at least one of (i) transfer energy supplied by the energy storage device 106 to the first motor 110 while the first motor 110 is in the first state, or (ii) transfer energy from the first motor 110 to the energy storage device 106 to be stored in the energy storage device 106 while the first motor 110 is in the second state. In some embodiments, the motor control module 210 comprises at least one of a motor driver 218, a boost converter 220, or one or more other suitable components. In some embodiments, the motor driver 218 controls an amount of energy from the energy storage device 106 supplied to the first motor 110. In some embodiments, the speed of the first motor 110 is a function of the amount of energy supplied to the first motor 110, where an increase of the amount of energy is associated with an increase of the speed of the first motor 110. Thus, in accordance with some embodiments, the motor driver 218 controls the speed of the first motor 110 by controlling the amount of energy supplied to the first motor 110.

Figure 3A:
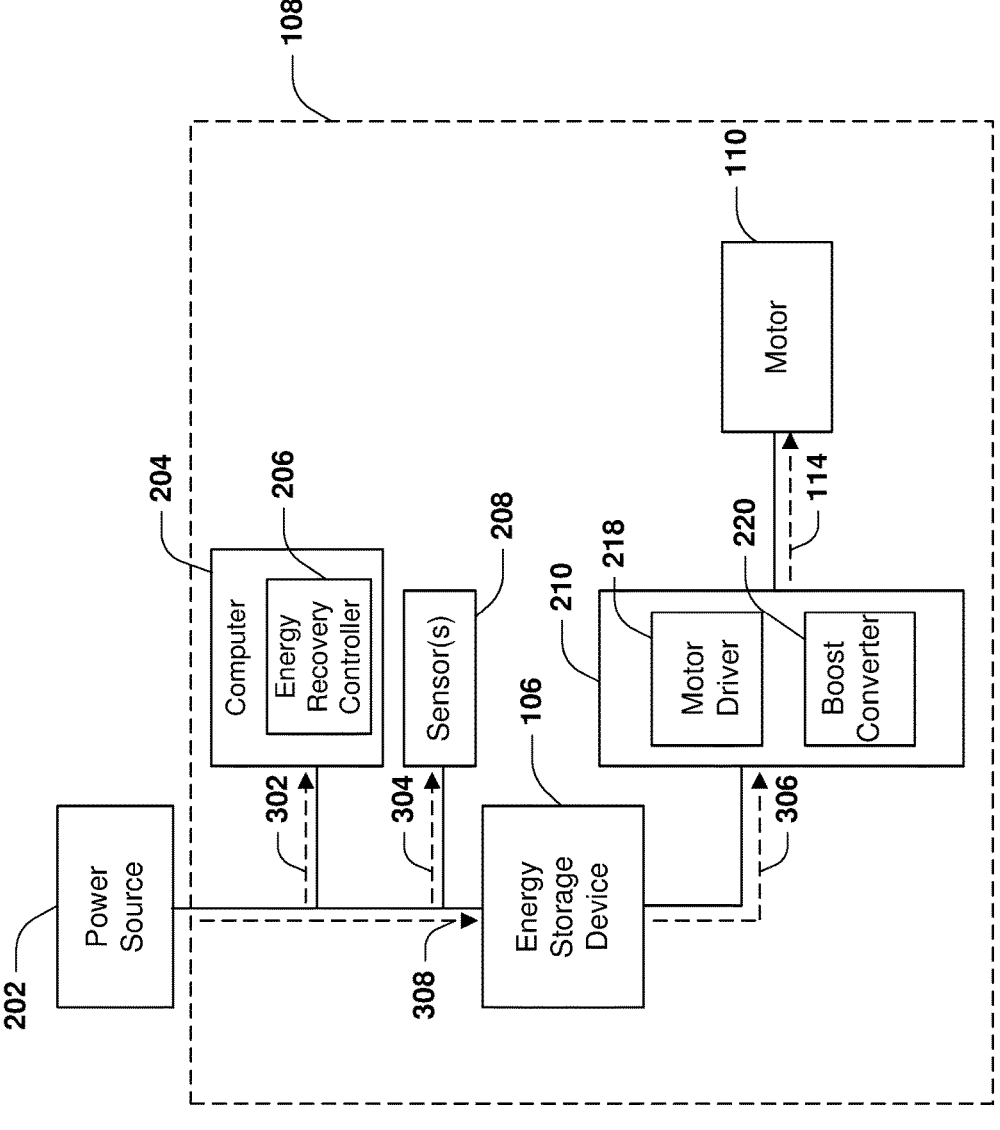
FIG. 3A illustrates a component block diagram showing energy flow of a stocking vehicle while a motor of the stocking vehicle is in a first state, in accordance with some embodiments.
Figure 3A:

FIG. 3A illustrates energy flow in the stocking vehicle 108 while the first motor 110 is in the first state, in accordance with some embodiments. In some embodiments, the power source 202 at least one of (i) supplies energy 302 to the computer 204, (ii) supplies energy 304 to the one or more sensors 208, or (iii) supplies energy 308 to the energy storage device 106. In some embodiments, the energy storage device 106 stores the energy 308 supplied by the power source 202. In some embodiments, while the first motor 110 is in the first state, the energy storage device 106 supplies energy 306 to the motor control module 210. In some embodiments, while the first motor 110 is in the first state, the first energy 114 is supplied to the first motor 110 using the motor control module 210. In some embodiments, the motor control module 210 controls at least one of a voltage, a current, or other parameter of the first energy 114 to control at least one of a speed or a direction of rotation of the first motor 110. In some embodiments, the motor control module 210 converts the energy 306 to the first energy 114 supplied to the first motor 110. In some embodiments, the first energy 114 is at least one of generated or supplied to the first motor 110 using the motor driver 218. In some embodiments, the boost converter 220 is inactive while at least one of the first motor 110 is in the first state or the first energy 114 is supplied to the first motor 110.

Figure 3B:
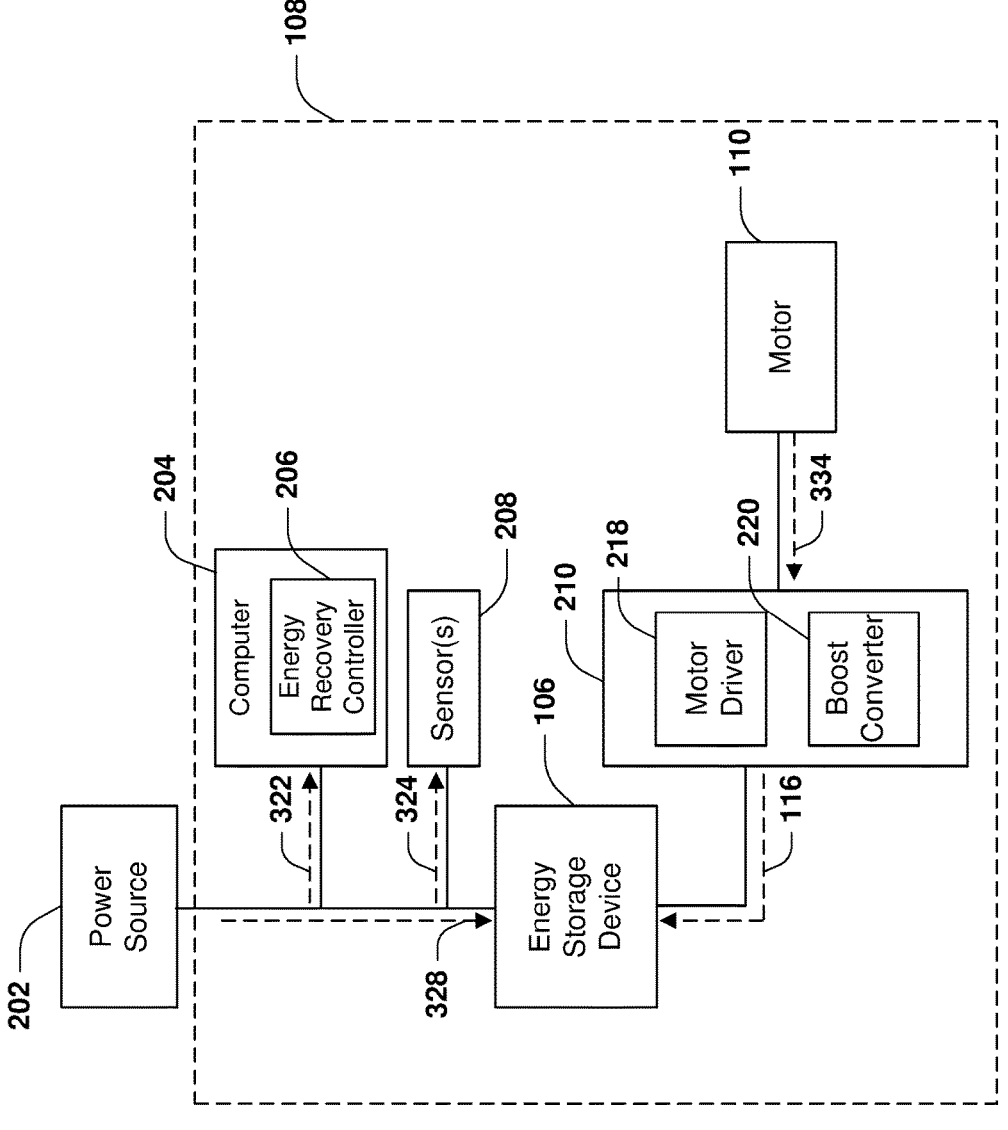
FIG. 3B illustrates a component block diagram showing energy flow of a stocking vehicle while a motor of the stocking vehicle is in a second state, in accordance with some embodiments.

FIG. 3B illustrates energy flow in the stocking vehicle 108 while the first motor 110 is in the second state, in accordance with some embodiments. In some embodiments, the power source 202 at least one of (i) supplies energy 322 to the computer 204, (ii) supplies energy 324 to the one or more sensors 208, or (iii) supplies energy 328 to the energy storage device 106. In some embodiments, the energy storage device 106 stores the energy 328 supplied by the power source 202.

In some embodiments, while the first motor 110 is in the second state, the energy storage device 106 harvests the second energy 116. In some embodiments, the second energy 116 is harvested using the boost converter 220. In some embodiments, the boost converter 220 is used to transform mechanical energy of the first motor 110 into electrical energy, such as during motor braking of the first motor 110. In some embodiments, the motor control module 210 controls at least one of a voltage, a current, or other parameter of the second energy 116. In some embodiments, the second energy 116 at least one of comprises or is obtained from energy 334 generated by the first motor 110 while the first motor 110 is in the second state. In some embodiments, the first motor 110 induces a counter electromotive force (EMF) voltage. In some embodiments, the energy 334 has the counter EMF voltage induced by the first motor 110. In some embodiments, the boost converter 220 is active while at least one of the first motor 110 is in the first state or the second energy 116 is harvested using the energy storage device 106. In some embodiments, the boost converter 220 converts the counter EMF voltage of the energy 334 to a second voltage of the second energy 116. In some embodiments, the second voltage is greater than the counter EMF voltage. In some embodiments, at least one of the counter EMF voltage or the second voltage is greater than a threshold voltage while the first motor 110 is in the second state. In some embodiments, the first motor 110 functions as an electric generator when at least one of the second voltage or the counter EMF voltage is greater than the threshold voltage. In some embodiments, the threshold voltage is at least one of based upon or about equal to a supply voltage of the energy storage device 106. In some embodiments, the counter EMF voltage is not greater than the threshold voltage while the first motor 110 is in the first state.

Figure 4:
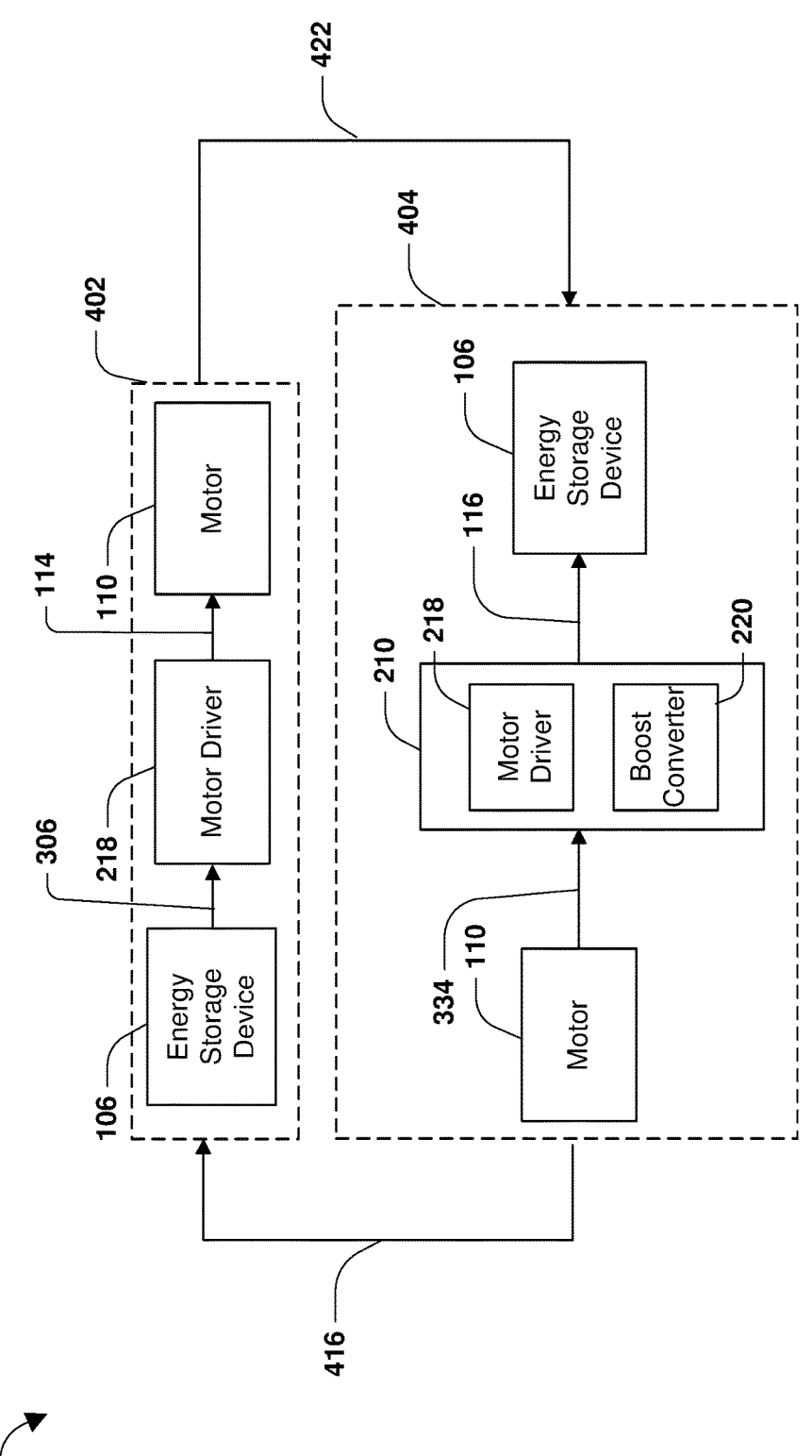
FIG. 4 illustrates a component block diagram showing transition between an energy discharge state of a stocking vehicle and an energy regeneration state of the stocking vehicle, in accordance with some embodiments.

FIG. 4 illustrates transition between an energy discharge state 402 of the stocking vehicle 108 and an energy regeneration state 404 of the stocking vehicle 108, according to some embodiments. In some embodiments, in the energy discharge state 402, the energy storage device 106 supplies the first energy 114 to the first motor 110 using the motor driver 218. In some embodiments, the stocking vehicle 108 is in the energy discharge state 402 while the first motor 110 is in the first state. In some embodiments, the first motor 110 accelerates while the stocking vehicle 108 is in the energy discharge state 402. In some embodiments, the stocking vehicle 108 transitions 422 from the energy discharge state 402 to the energy regeneration state 404. In some embodiments, the transition 422 from the energy discharge state 402 to the energy regeneration state 404 is associated with a transition of the first motor 110 from the first state to the second state. In some embodiments, the transition 422 from the energy discharge state 402 to the energy regeneration state 404 is associated with a transition of the first motor 110 from accelerating to decelerating.

In some embodiments, in the energy regeneration state 404, the second energy 116 is harvested using at least one of the boost converter 220, the motor driver 218, or the energy storage device 106. In some embodiments, while the first motor 110 at least one of brakes or decelerates, mechanical energy associated with the first motor 110 is converted to the second energy 116 using at least one of the first motor 110 or the boost converter 220. In some embodiments, the stocking vehicle 108 is in the energy regeneration state 404 while the first motor 110 is in the second state. In some embodiments, the first motor 110 at least one of brakes or decelerates while the stocking vehicle 108 is in the energy regeneration state 404. In some embodiments, the stocking vehicle 108 transitions 416 from the energy regeneration state 404 to the energy discharge state 402. In some embodiments, the transition 416 from the energy regeneration state 404 to the energy discharge state 402 is associated with a transition of the first motor 110 from the second state to the first state. In some embodiments, the transition 416 from the energy regeneration state 404 to the energy discharge state 402 is associated with a transition of the first motor 110 from decelerating to accelerating.

In some embodiments, a first controller 506 (shown in FIG. 5) is configured to determine a first speed of the first motor 110. In some embodiments, in response to determining the first speed, the first controller 506 transmits an indication of the first speed to at least one of the computer 204, the energy storage device 106, the motor control module 210, or other suitable device. In some embodiments, in response to the indication of the first speed, the motor driver 218 of the motor control module 210 drives the first motor 110 to operate at the first speed.

In some embodiments, the first controller 506 comprises at least one of hardware, software, the stocking controller 104, the computer 204, the energy recovery controller 206, or one or more other suitable components. In some embodiments, the first speed of the first motor 110 is determined based upon first information comprising at least one of (i) a processing time parameter of the first product unit, (ii) a priority of the first product unit, (iii) a stocker idle status of the stocking vehicle 108, or (iv) one or more other suitable parameters.

In some embodiments, the processing time parameter is based upon at least one of (i) a scheduled time of a subsequent process scheduled to be performed on one or more items stored in the first product unit, (ii) a scheduled production time corresponding to a time at which fabrication of the one or more items stored in the first product unit is scheduled to be completed, (iii) a delivery time requirement corresponding to a duration of time within which the first product unit is required to be delivered to the second location or other location, or (iv) other suitable information. In some embodiments, the processing time parameter is based upon, such as equal to, a duration of time between a current time and the scheduled time of the subsequent process. In some embodiments, the subsequent process comprises at least one of the first process or other suitable process. In some embodiments, the processing time parameter is based upon, such as equal to, a duration of time between the current time and the scheduled production time. In some embodiments, the priority of the first product unit is based upon at least one of (i) a sensitivity of one or more items stored in the first product unit, (ii) a priority value assigned to the one or more items stored in the first product unit, (iii) the scheduled production time, or (iv) other suitable information.

In some embodiments, the stocker idle status is indicative of whether the stocking vehicle 108 is in an idle state. In some embodiments, the stocking vehicle 108 is considered to be in the idle state when at least one of (i) one, some or all motors of the stocking vehicle 108 are at least one of deactivated or not running, (ii) one, some or all stocking components of the stocking vehicle 108 are at least one of in a stable position or not moving, (iii) the stocking vehicle 108 is included in a list of idle stocking vehicles, or (iv) the stocking vehicle 108 does not currently have an active order from a controller, such as the stocking controller 104, to perform a stocking operation. In some embodiments, the list of idle stocking vehicles is indicative of a set of stocking vehicles, of the automated material handling system 100, that are in the idle state. In some embodiments, the stocking controller 104 forces the set of stocking vehicles into the idle state for a predefined duration of time. In some embodiments, the stocking controller 104 forces the set of stocking vehicles into the idle state to limit power usage of stocking vehicles of the automated material handling system 100. In some embodiments, the set of stocking vehicles comprise a subset of stocking vehicles of a plurality of stocking vehicles of the automated material handling system 100. In some embodiments, the stocking controller 104 sets stocking vehicles to the idle state such that stocking vehicles amounting to at least a threshold proportion of the plurality of stocking vehicles are in the idle state.

In some embodiments, an urgency score associated with the first stocking operation is determined based upon the first information. In some embodiments, the first speed of the first motor 110 is determined based upon the urgency score. In some embodiments, the first speed of the first motor 110 is a function of the urgency score, where an increase of the urgency score is associated with an increase of the first speed of the first motor 110. In some embodiments, the urgency score is compared with a first threshold urgency score. In some embodiments, the first controller 506 sets the first speed of the first motor 110 to a first value in response to the urgency score being greater than the first threshold urgency score. In some embodiments, the first controller 506 sets the first speed of the first motor 110 to a second value in response to the urgency score not being greater than the first threshold urgency score. In some embodiments, the first value is greater than the second value.

In some embodiments, the first controller 506 determines a stocking operation mode of the first stocking operation based upon the first information. In some embodiments, the first speed is determined based upon the stocking operation mode. In some embodiments, the stocking operation mode of the first stocking operation is selected from among a plurality of stocking operation modes associated with different speeds. In some embodiments, the plurality of stocking operation modes comprises a first stocking operation mode 508 (shown in FIG. 5) and a second stocking operation mode 510 (shown in FIG. 5). In some embodiments, the first stocking operation mode 508 corresponds to low speed mode, such as eco-mode, associated with at least one of (i) the first stocking operation being performed in a relatively slower manner, or (ii) the first stocking operation being performed using a relatively lesser amount of energy. In some embodiments, the second stocking operation mode 510 corresponds to high speed mode associated with at least one of (i) the first stocking operation being performed in a relatively faster manner, or (ii) the first stocking operation being performed using a relatively greater amount of energy. In some embodiments, the first controller 506 selects the first stocking operation mode 508 for the first stocking operation based upon the urgency score not being greater than the first threshold urgency score. In some embodiments, the first controller 506 selects the second stocking operation mode 510 for the first stocking operation based upon the urgency score being greater than the first threshold urgency score. In some embodiments, the first controller 506 sets the first speed of the first motor 110 to a third value based upon the first stocking operation mode 508 being selected for the first stocking operation. In some embodiments, the first controller 506 sets the first speed of the first motor 110 to a fourth value based upon the second stocking operation mode 510 being selected for the first stocking operation. In some embodiments, the fourth value is greater than the third value.

Figure 5:
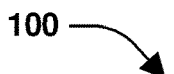
FIG. 5 illustrates a block diagram showing determination of a stocking operation mode of a first stocking operation, in accordance with some embodiments.
Figure 5:
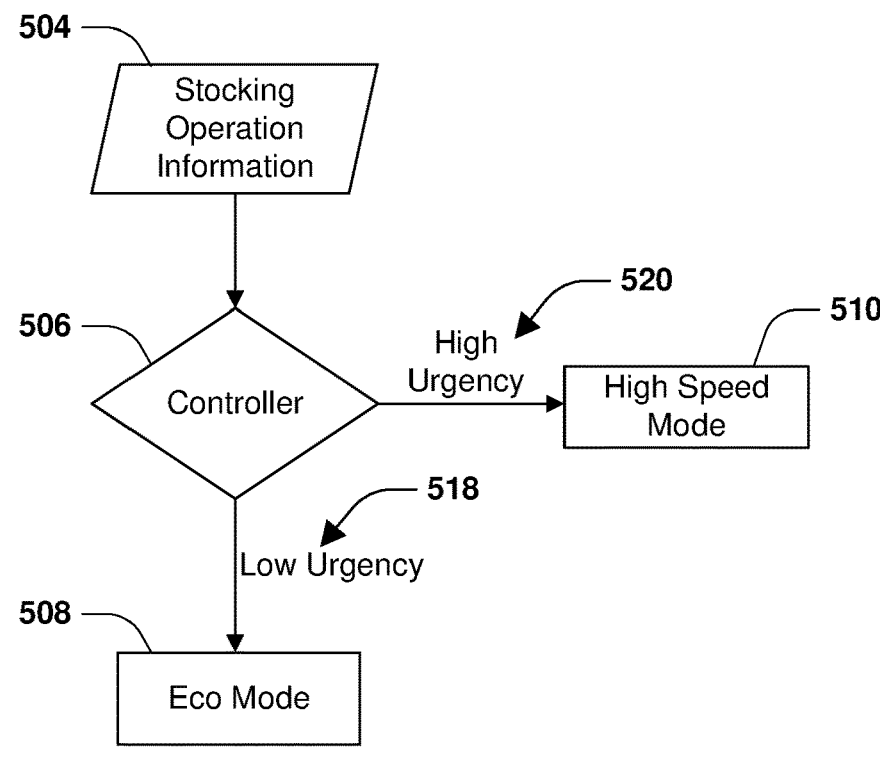

FIG. 5 illustrates determination of the stocking operation mode of the first stocking operation, in accordance with some embodiments. In some embodiments, stocking operation information 504 is input to the first controller 506. In some embodiments, the stocking operation information 504 comprises the first information. In some embodiments, the first controller 506 determines whether to use the first stocking operation mode 508 or the second stocking operation mode 510 based upon the stocking operation information 504. In some embodiments, the first controller 506 determines whether the first stocking operation has a low urgency classification 518 or a high urgency classification 520 based upon the stocking operation information 504. In some embodiments, the first controller 506 determines the urgency score associated with the first stocking operation based upon the stocking operation information 504. In some embodiments, the first controller 506 determines that the first stocking operation has the low urgency classification 518 based upon the urgency score not being greater than the first threshold urgency score. In some embodiments, the first controller 506 determines that the first stocking operation has the high urgency classification 520 based upon the urgency score being greater than the first threshold urgency score.

In some embodiments, the first controller 506 determines to use the first stocking operation mode 508 for the first stocking operation in response to determining that the first stocking operation has the low urgency classification 518. In some embodiments, the first stocking operation is performed according to the first stocking operation mode 508 in response to determining to use the first stocking operation mode 508 for the first stocking operation. In some embodiments, when the first stocking operation is performed according to the first stocking operation mode 508, at least one of (i) the first motor 110 of the stocking vehicle 108 is operated within a first range of speeds, (ii) the stocking vehicle 108 consumes a first amount of energy performing the first stocking operation, or (iii) the first stocking operation takes a first duration of time to complete using the stocking vehicle 108.

In some embodiments, the first controller 506 determines to use the second stocking operation mode 510 for the first stocking operation in response to determining that the first stocking operation has the high urgency classification 520. In some embodiments, the first stocking operation is performed according to the second stocking operation mode 510 in response to determining to use the second stocking operation mode 510 for the first stocking operation. In some embodiments, when the first stocking operation is performed according to the second stocking operation mode 510, at least one of (i) the first motor 110 of the stocking vehicle 108 is operated within a second range of speeds, (ii) the stocking vehicle 108 consumes a second amount of energy performing the first stocking operation, or (iii) the first stocking operation takes a second duration of time to complete using the stocking vehicle 108. In some embodiments, a maximum speed of the second range of speeds associated with the second stocking operation mode 510 is greater than a maximum speed of the first range of speeds associated with the first stocking operation mode 508. In some embodiments, the second amount of energy associated with the second stocking operation mode 510 is greater than the first amount of energy associated with the first stocking operation mode 508. In some embodiments, the second duration of time associated with the second stocking operation mode 510 is less than the first duration of time associated with the first stocking operation mode 508.

In some embodiments, one, some or all acts shown in and/or described with respect to FIG. 5 are performed in response to initiating the first stocking operation. In some embodiments, the first stocking operation is initiated in response to the first product unit becoming available for transport. In some embodiments, the first stocking operation is initiated in response to the first product unit arriving at the first location.

Figure 6:
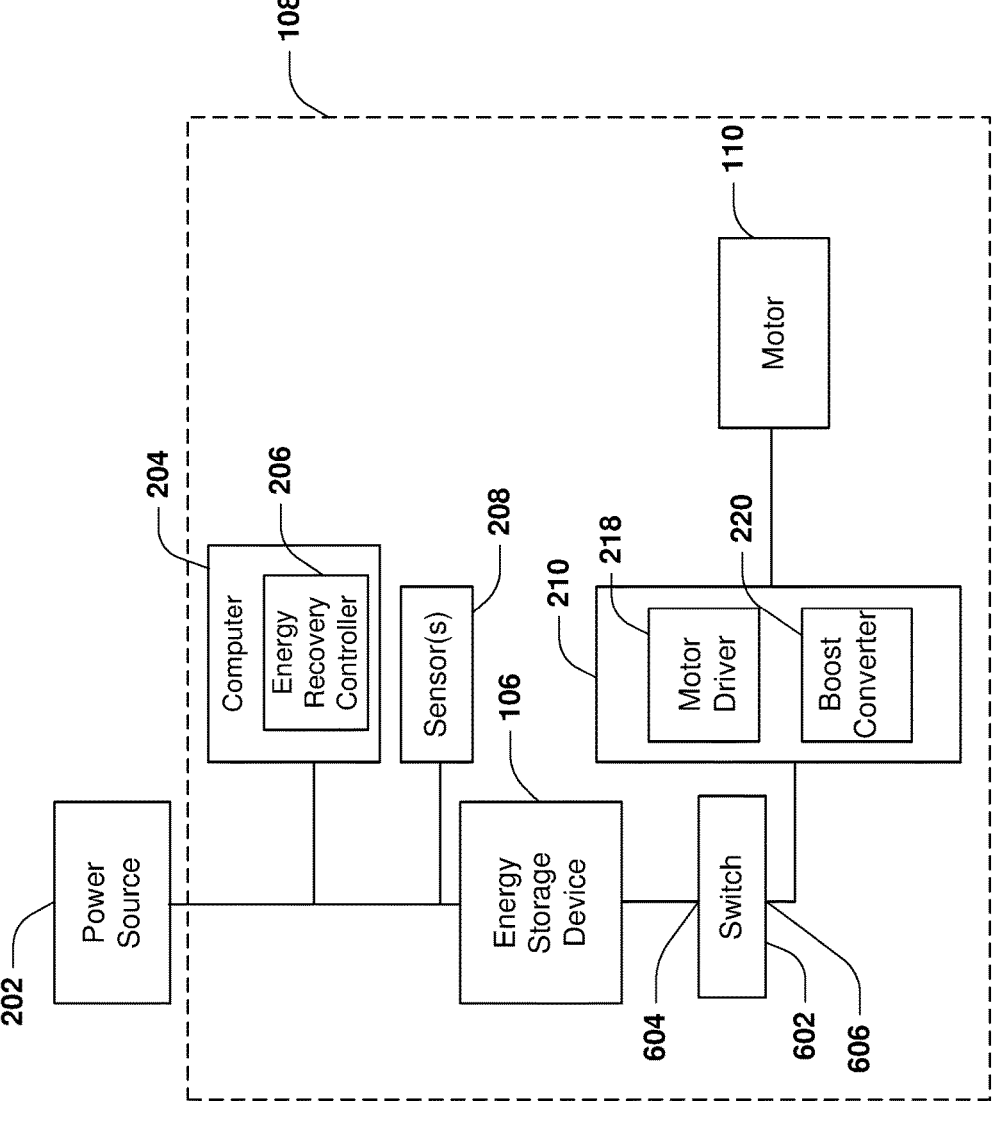
FIG. 6 illustrates a component block diagram of a stocking vehicle comprising a first switch, in accordance with some embodiments.
Figure 6:

FIG. 6 illustrates the stocking vehicle 108 comprising a first switch 602, according to some embodiments. In some embodiments, the first switch 602 comprises at least one of a relay or one or more other suitable components. In some embodiments, the relay comprises at least one of a power relay, an electromagnetic relay, a solid-state relay, or other suitable relay. In some embodiments, the first switch 602 comprises a first node 604 connected to the energy storage device 106 and a second node 606 connected to at least one of the first motor 110 or the motor control module 210. In some embodiments, when the first switch 602 is in an open state, the first switch 602 disconnects the energy storage device 106 from at least one of the first motor 110 or the motor control module 210. In some embodiments, when the first switch 602 is in a closed state, the first switch 602 provides a connection between the energy storage device 106 and at least one of the first motor 110 or the motor control module 210. Other positions of the first switch 602 other than the position shown in FIG. 6 are within the scope of the present disclosure. In some embodiments, the first switch 602 is disposed between the motor control module 210 and the first motor 110.

Figure 7:
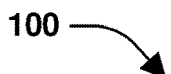
FIG. 7 illustrates a block diagram showing operation of a first switch, in accordance with some embodiments.
Figure 7:
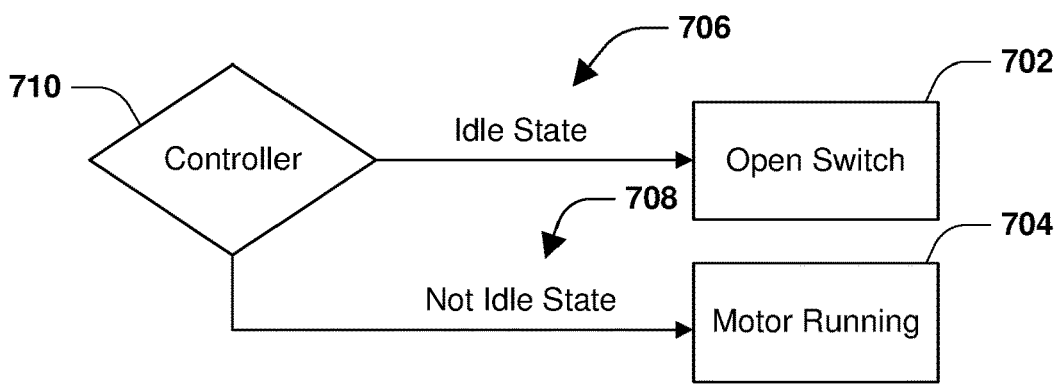

FIG. 7 illustrates a second controller 710 controlling the first switch 602, in accordance with some embodiments. In some embodiments, the second controller 710 comprises at least one of hardware, software, the first controller 506, the stocking controller 104, the computer 204, the energy recovery controller 206, or one or more other suitable components. In some embodiments, the second controller 710 controls the first switch 602 based upon the stocker idle status associated with the stocking vehicle 108. In some embodiments, the second controller 710 controls the first switch 602 to be in the open state when the stocking vehicle 108 is in the idle state. In some embodiments, the second controller 710 controls the first switch 602 to be in the closed state when the stocking vehicle 108 is not in the idle state. In some embodiments, the second controller 710 outputs a first instruction 702 to open the first switch 602 in response to a determination 706 that the stocking vehicle 108 is in the idle state. In some embodiments, opening the first switch 602 deactivates the first motor 110. In some embodiments, the second controller 710 outputs a second instruction 704 to close the first switch 602 in response to a determination 708 that the stocking vehicle 108 is not in the idle state. In some embodiments, closing the first switch 602 activates the first motor 110.

Figure 8A:
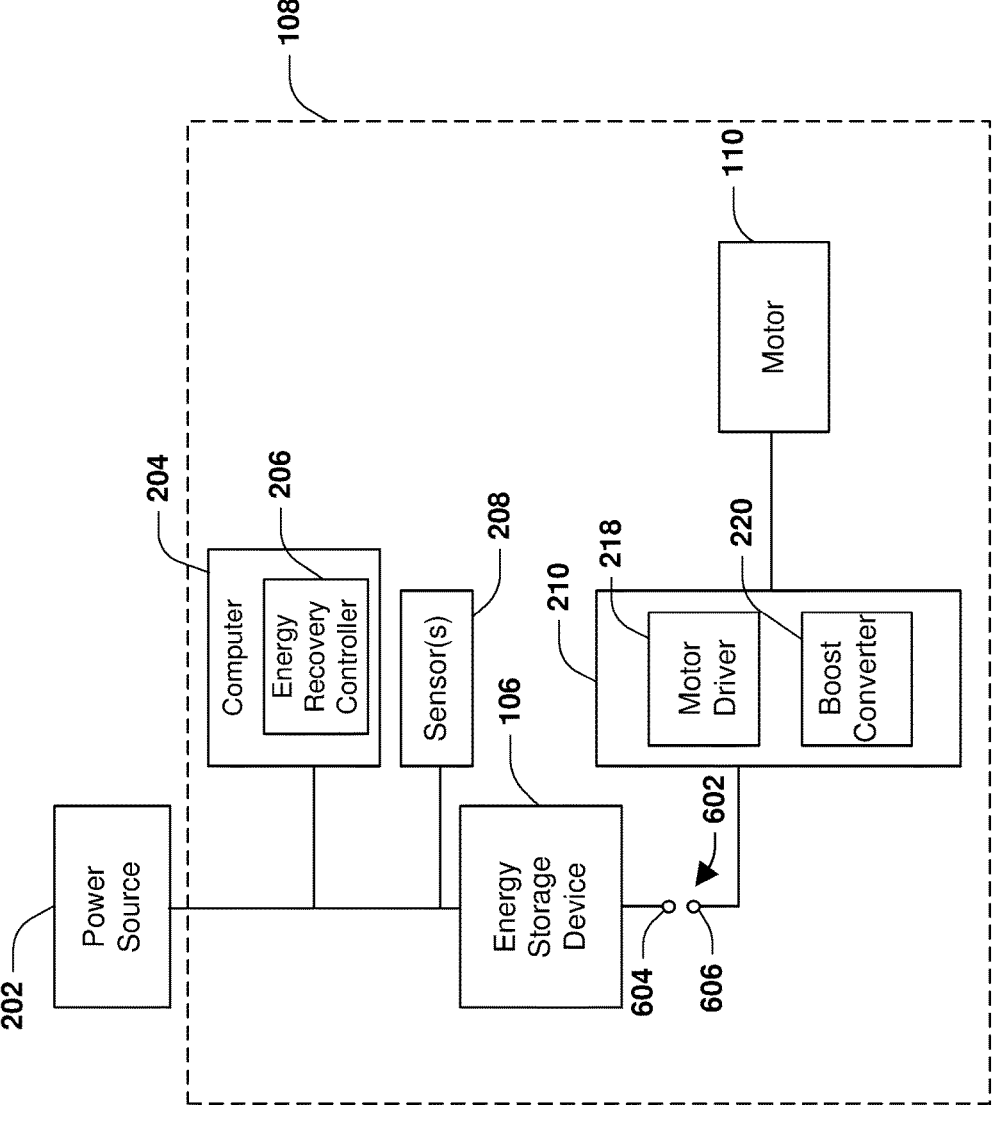
FIG. 8A illustrates a component block diagram showing energy flow of a stocking vehicle while a motor of the stocking vehicle is in a first state, in accordance with some embodiments.
Figure 8A:
Figure 8B:
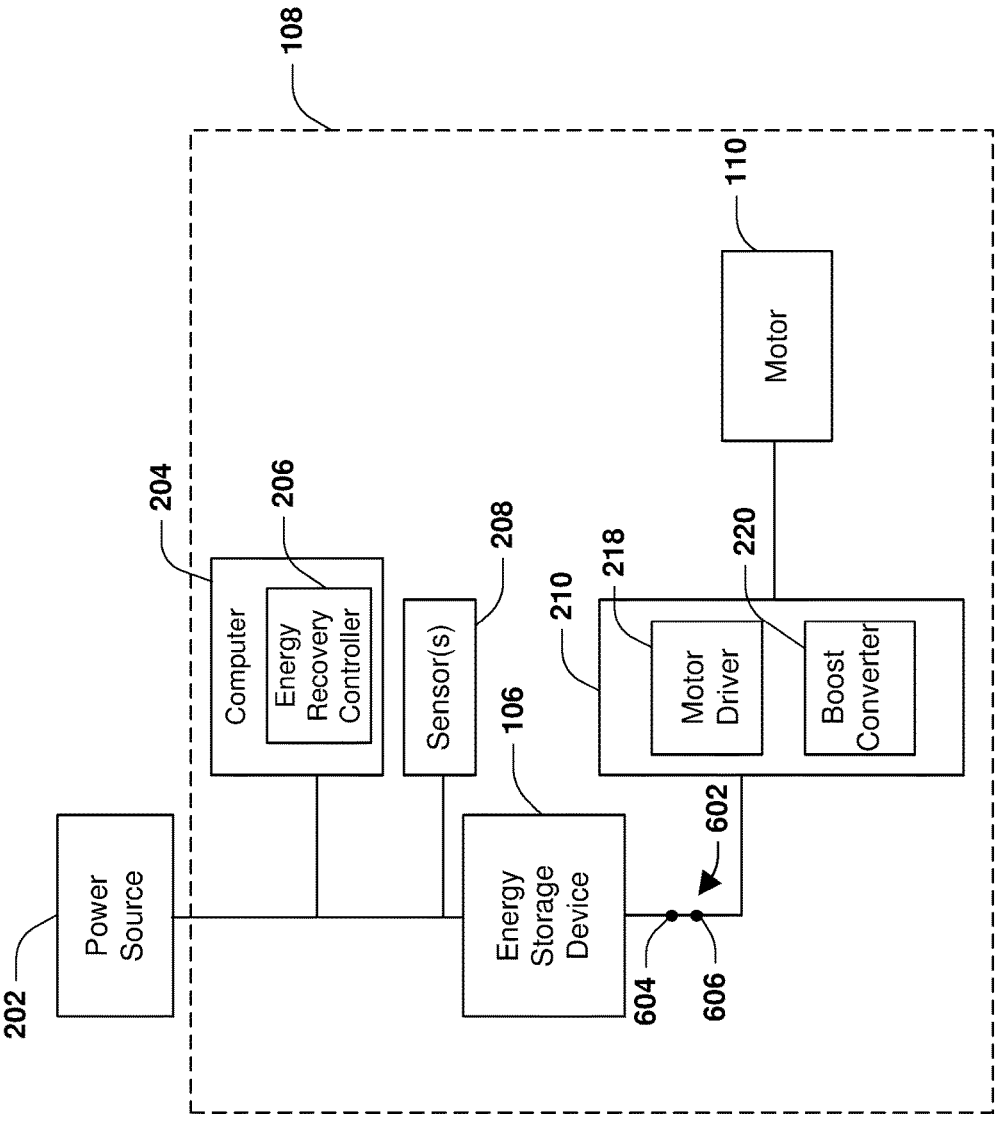
FIG. 8B illustrates a component block diagram showing energy flow of a stocking vehicle while a motor of the stocking vehicle is in a second state, in accordance with some embodiments.

FIG. 8A illustrates the stocking vehicle 108 while the first switch 602 is in the open state, in accordance with some embodiments. In some embodiments, disconnecting the first motor 110 from the energy storage device 106 using the first switch 602 mitigates energy consumption by the first motor 110 when the stocking vehicle 108 is in the idle state, such as due, at least in part, to the first motor 110 being cut off from the energy storage device 106, thereby providing for reduced energy waste and/or improved energy efficiency of the stocking vehicle 108. FIG. 8B illustrates the stocking vehicle 108 while the first switch 602 is in the closed state, in accordance with some embodiments.

Figure 9:
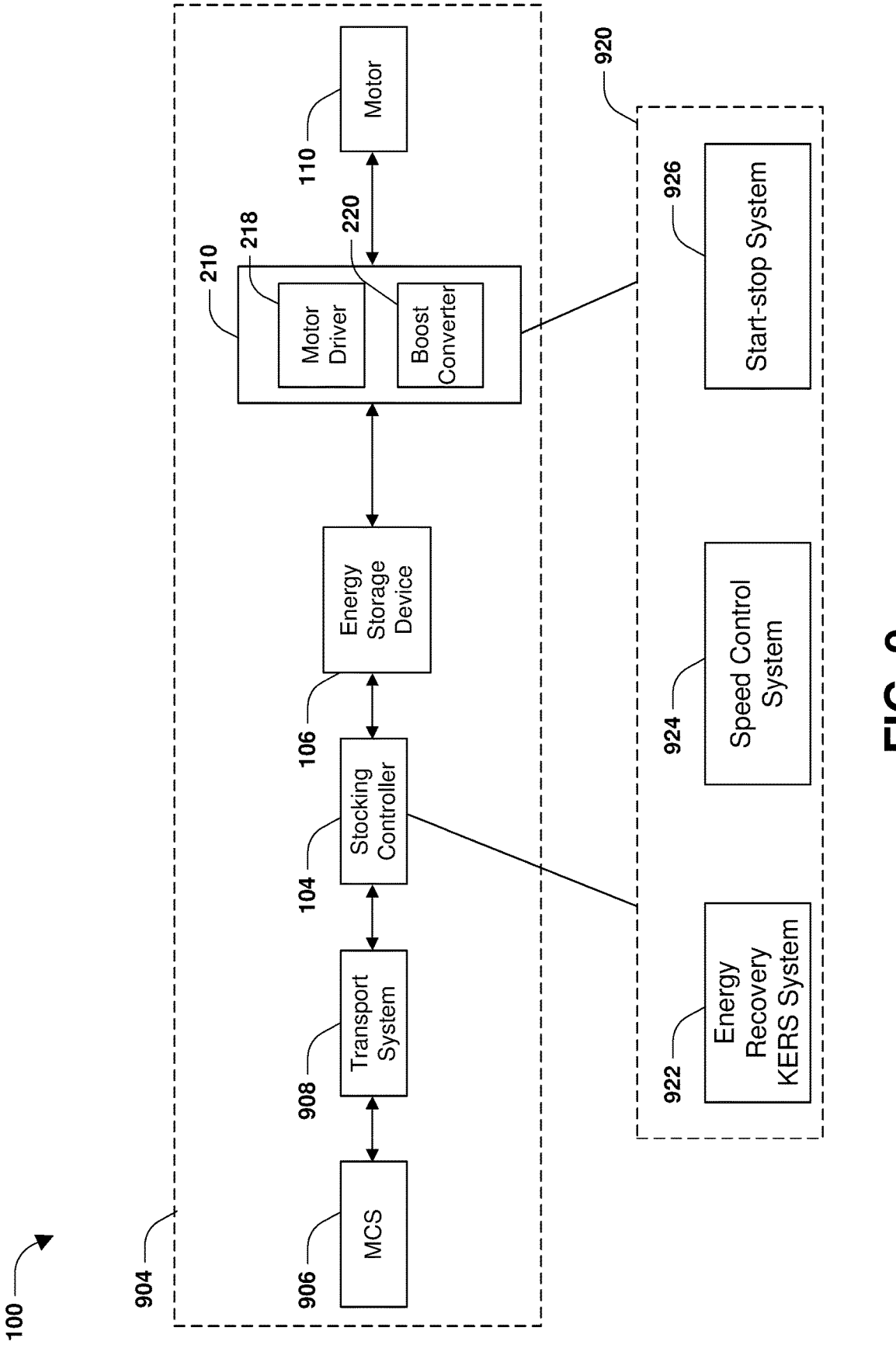
FIG. 9 illustrates a component block diagram of an automated material handling system, in accordance with some embodiments.

FIG. 9 illustrates the automated material handling system 100, in accordance with some embodiments. In some embodiments, the automated material handling system 100 comprises a transfer automation system 904 and an energy consumption control system 920. In some embodiments, the transfer automation system 904 comprises at least one of a material control system (MCS) 906, a transportation system 908 such as an overhead hoist transport (OHT) system, the stocking controller 104, the energy storage device 106, the motor control module 210, or the first motor 110. In some embodiments, the energy consumption control system 920 comprises at least one of an energy recovery system 922, such as a KERS system, a speed control system 924, or a start-stop system 926. In some embodiments, the energy recovery system 922 at least one of communicates with or controls at least one of the stocking controller 104, the computer 204, the energy storage device 106, or the motor control module 210 to harvest energy from the first motor 110 during operation of the stocking vehicle 108. In some embodiments, the speed control system 924 controls a speed of the first motor 110 during operation of the stocking vehicle 108. In some embodiments, the speed control system 924 comprises the first controller 506. In some embodiments, the start-stop system 926 controls the first switch 602. In some embodiments, the start-stop system 926 comprises the second controller 710. In some embodiments, the energy consumption control system 920 performs pattern recognition to identify patterns in energy flow in stocking vehicles of the automated material handling system 100, and adjusts one or more parameters of the stocking vehicle 108 based upon the identified patterns.

Figure 10A:
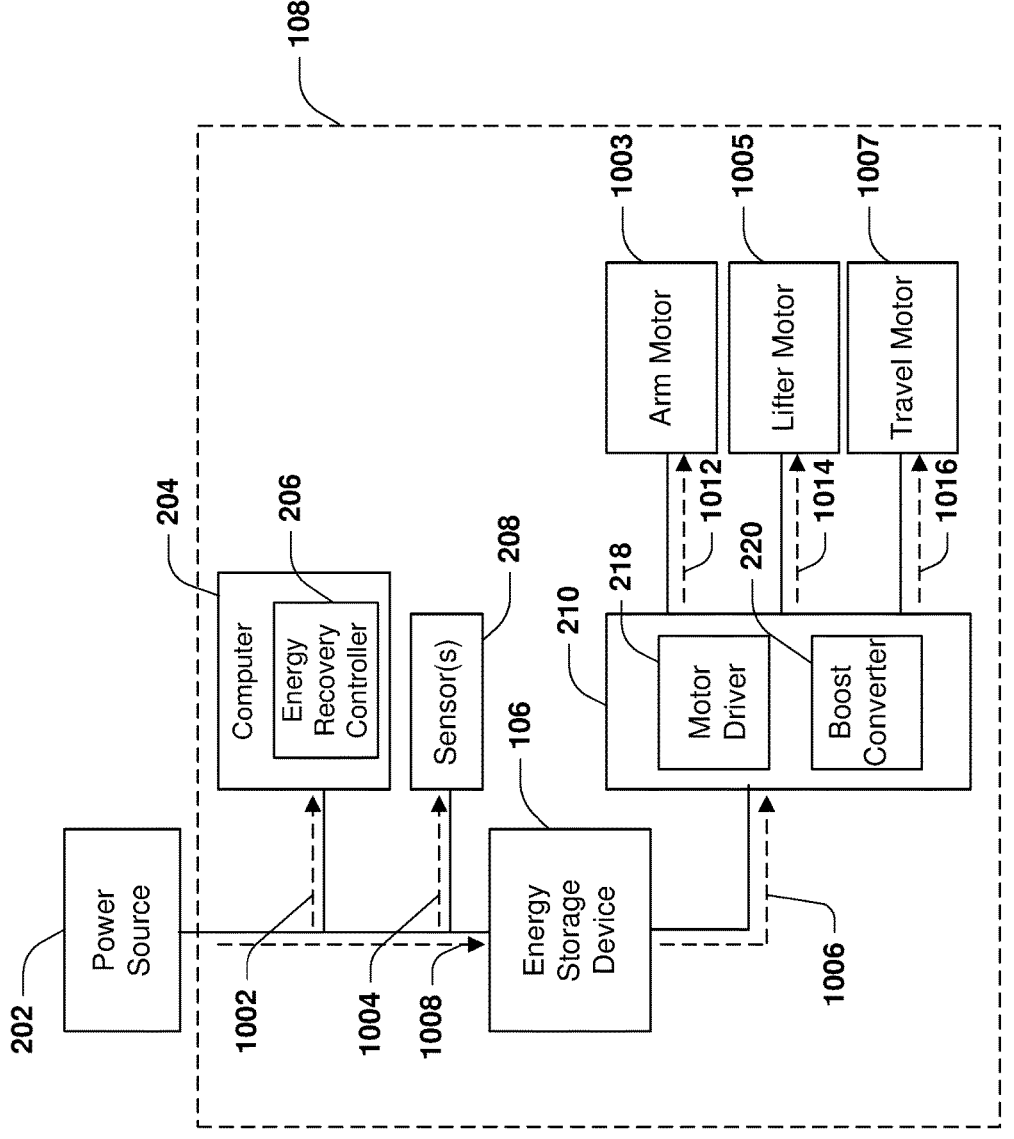
FIG. 10A illustrates a component block diagram showing energy flow of a stocking vehicle while a motor of the stocking vehicle is in a first state, in accordance with some embodiments.
Figure 10A:
Figure 10B:
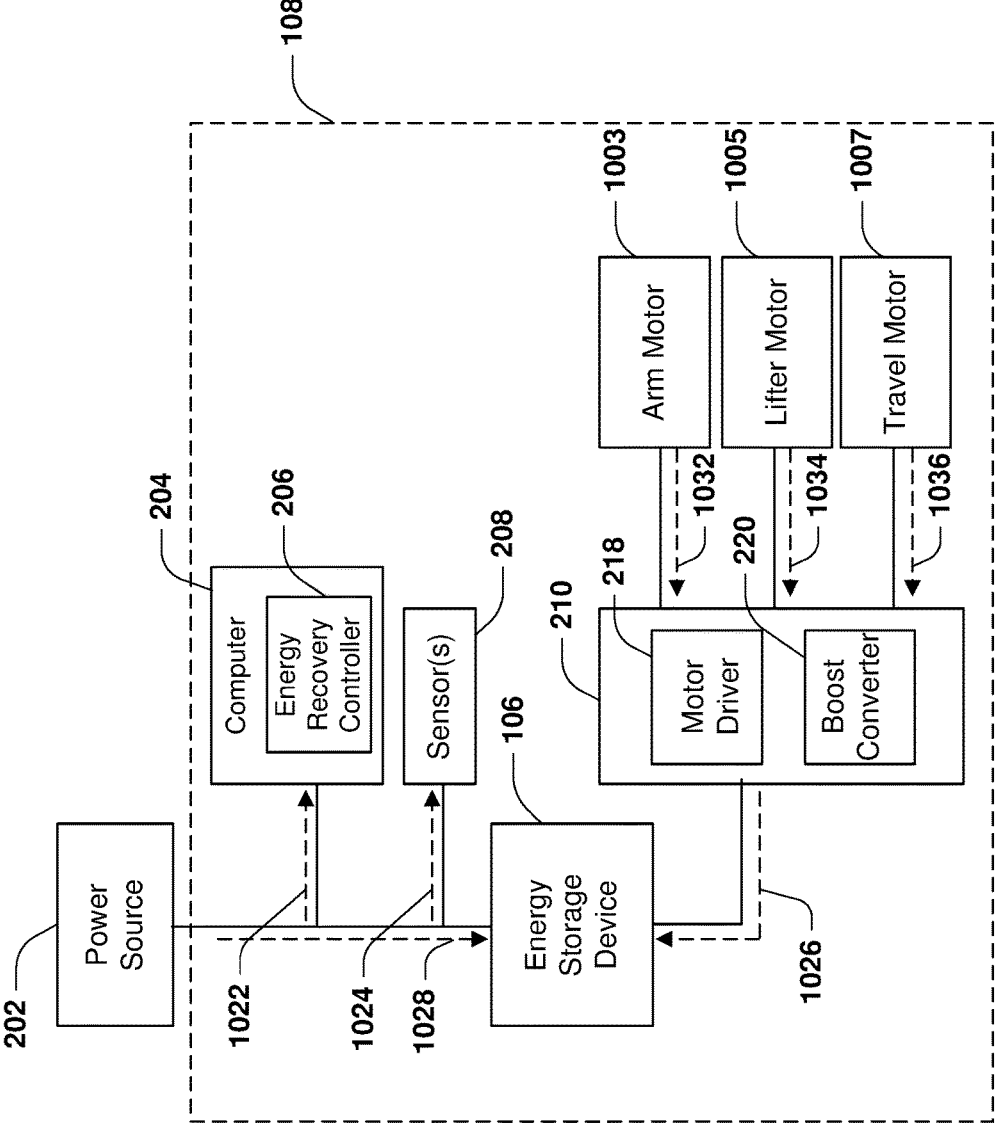
FIG. 10B illustrates a component block diagram showing energy flow of a stocking vehicle while a motor of the stocking vehicle is in a second state, in accordance with some embodiments.
Figure 10B:

FIGS. 10A-10B illustrate the stocking vehicle 108 comprising a plurality of motors, in accordance with some embodiments. In some embodiments, each motor of one, some, or all of the plurality of motors has one or more of the features, functions, characteristics, interactions with other components, etc. provided herein with respect to the first motor 110. In some embodiments, each motor of one, some, or all of the plurality of motors performs one or more of the actions provided herein with respect to the first motor 110. In some embodiments, the plurality of motors comprise at least one of an arm motor 1003, a lifter motor 1005, a travel motor 1007, or one or more other suitable motors.

In some embodiments, the arm motor 1003 is coupled to an arm 1126 (shown in FIGS. 11-19) of the stocking vehicle 108. In some embodiments, the arm 1126 is configured to support the first product unit. In some embodiments, the arm 1126 comprises a platform to support a load, such as the first product unit, during movement of the stocking vehicle 108. In some embodiments, the arm 1126 comprises a robotic arm. In some embodiments, the arm motor 1003 controls a position of the arm 1126. In some embodiments, the arm motor 1003 is configured to move the arm 1126 along a first axis 1116 (shown in FIGS. 11, 18, and 19). In some embodiments, the first axis 1116 corresponds to a first horizontal axis. In some embodiments, the first energy storage device 106 supplies energy to the arm motor 1003 while the arm motor 1003 is in the first state, such as using one or more of the techniques provided herein with respect to supplying the first energy 114 to the first motor 110 while the first motor 110 is in the first state. In some embodiments, the first energy storage device 106 harvests energy from the arm motor 1003 while the arm motor 1003 is in the second state, such as using one or more of the techniques provided herein with respect to harvesting the second energy 116 from the first motor 110 while the first motor 110 is in the second state. In some embodiments, the energy from the arm motor 1003 is harvested via regenerative braking.

In some embodiments, the lifter motor 1005 is coupled to at least one of the arm 1126 or a crane 1124 (shown in FIGS. 11-19) of the stocking vehicle 108. In some embodiments, the lifter motor 1005 controls an elevation of the arm 1126. In some embodiments, the lifter motor 1005 is configured to move the arm 1126 along a second axis 1120 (shown in FIGS. 11, 18, and 19) different than the first axis 1116. In some embodiments, the second axis 1120 corresponds to a vertical axis. In some embodiments, the second axis 1120 is perpendicular to the first axis 1116. In some embodiments, the first energy storage device 106 supplies energy to the lifter motor 1005 while the lifter motor 1005 is in the first state, such as using one or more of the techniques provided herein with respect to supplying the first energy 114 to the first motor 110 while the first motor 110 is in the first state. In some embodiments, the first energy storage device 106 harvests energy from the lifter motor 1005 while the lifter motor 1005 is in the second state, such as using one or more of the techniques provided herein with respect to harvesting the second energy 116 from the first motor 110 while the first motor 110 is in the second state. In some embodiments, the energy from the lifter motor 1005 is harvested via regenerative braking.

In some embodiments, the travel motor 1007 is coupled to the crane 1124 (shown in FIGS. 11-19) of the stocking vehicle 108. In some embodiments, the travel motor 1007 controls a position of the crane 1124. In some embodiments, the travel motor 1007 is configured to move the crane 1124 along a third axis 1118 (shown in FIGS. 11 and 19) different than at least one of the first axis 1116 or the second axis 1120. In some embodiments, the third axis 1118 corresponds to a second horizontal axis. In some embodiments, the third axis 1118 is perpendicular to the second axis 1120. In some embodiments, the first energy storage device 106 supplies energy to the travel motor 1007 while the travel motor 1007 is in the first state, such as using one or more of the techniques provided herein with respect to supplying the first energy 114 to the first motor 110 while the first motor 110 is in the first state. In some embodiments, the first energy storage device 106 harvests energy from the travel motor 1007 while the travel motor 1007 is in the second state, such as using one or more of the techniques provided herein with respect to harvesting the second energy 116 from the first motor 110 while the first motor 110 is in the second state. In some embodiments, the energy from the travel motor 1007 is harvested via regenerative braking.

FIG. 10A illustrates energy flow in the stocking vehicle 108 while at least one of the arm motor 1003, the lifter motor 1005, or the travel motor 1007 is in the first state, in accordance with some embodiments. In some embodiments, the power source 202 at least one of (i) supplies energy 1002 to the computer 204, (ii) supplies energy 1004 to the one or more sensors 208, or (iii) supplies energy 1008 to the energy storage device 106. In some embodiments, the energy storage device 106 stores the energy 1008 supplied by the power source 202. In some embodiments, while at least one of the arm motor 1003, the lifter motor 1005, or the travel motor 1007 is in the first state, the energy storage device 106 supplies energy 1006 to the motor control module 210.

In some embodiments, while the arm motor 1003 is in the first state, at least one of the energy storage device 106 or the motor control module 210 are used to supply energy 1012 to the arm motor 1003. In some embodiments, the motor control module 210 controls at least one of a voltage, a current, or other parameter of the energy 1012 to control at least one of a speed or a direction of rotation of the arm motor 1003. In some embodiments, the motor control module 210 converts the energy 1006 to the energy 1012 supplied to the arm motor 1003. In some embodiments, the energy 1012 is at least one of generated or supplied to the arm motor 1003 using the motor driver 218.

In some embodiments, while the lifter motor 1005 is in the first state, at least one of the energy storage device 106 or the motor control module 210 are used to supply energy 1014 to the lifter motor 1005. In some embodiments, the motor control module 210 controls at least one of a voltage, a current, or other parameter of the energy 1014 to control at least one of a speed or a direction of rotation of the lifter motor 1005. In some embodiments, the motor control module 210 converts the energy 1006 to the energy 1014 supplied to the lifter motor 1005. In some embodiments, the energy 1014 is at least one of generated or supplied to the lifter motor 1005 using the motor driver 218.

In some embodiments, while the travel motor 1007 is in the first state, at least one of the energy storage device 106 or the motor control module 210 are used to supply energy 1016 to the travel motor 1007. In some embodiments, the motor control module 210 controls at least one of a voltage, a current, or other parameter of the energy 1016 to control at least one of a speed or a direction of rotation of the travel motor 1007. In some embodiments, the motor control module 210 converts the energy 1006 to the energy 1016 supplied to the travel motor 1007. In some embodiments, the energy 1016 is at least one of generated or supplied to the travel motor 1007 using the motor driver 218.

FIG. 10B illustrates energy flow in the stocking vehicle 108 while at least one of the arm motor 1003, the lifter motor 1005, or the travel motor 1007 is in the second state, in accordance with some embodiments. In some embodiments, the power source 202 at least one of (i) supplies energy 1022 to the computer 204, (ii) supplies energy 1024 to the one or more sensors 208, or (iii) supplies energy 1028 to the energy storage device 106. In some embodiments, the energy storage device 106 stores the energy 1028 supplied by the power source 202.

In some embodiments, while at least one of the arm motor 1003, the lifter motor 1005, or the travel motor 1007 is in the second state, the energy storage device 106 harvests energy 1026 from at least one of the arm motor 1003, the lifter motor 1005, or the travel motor 1007. In some embodiments, the motor control module 210 controls at least one of a voltage, a current, or other parameter of the energy 1026. In some embodiments, the energy 1026 at least one of comprises or is obtained from at least one of (i) energy 1032 generated by the arm motor 1003 while the arm motor 1003 is in the second state, (ii) energy 1034 generated by the lifter motor 1005 while the lifter motor 1005 is in the second state, or (iii) energy 1036 generated by the travel motor 1007 while the travel motor 1007 is in the second state. In some embodiments, the energy 1026 is harvested using the boost converter 220.

Figure 11:
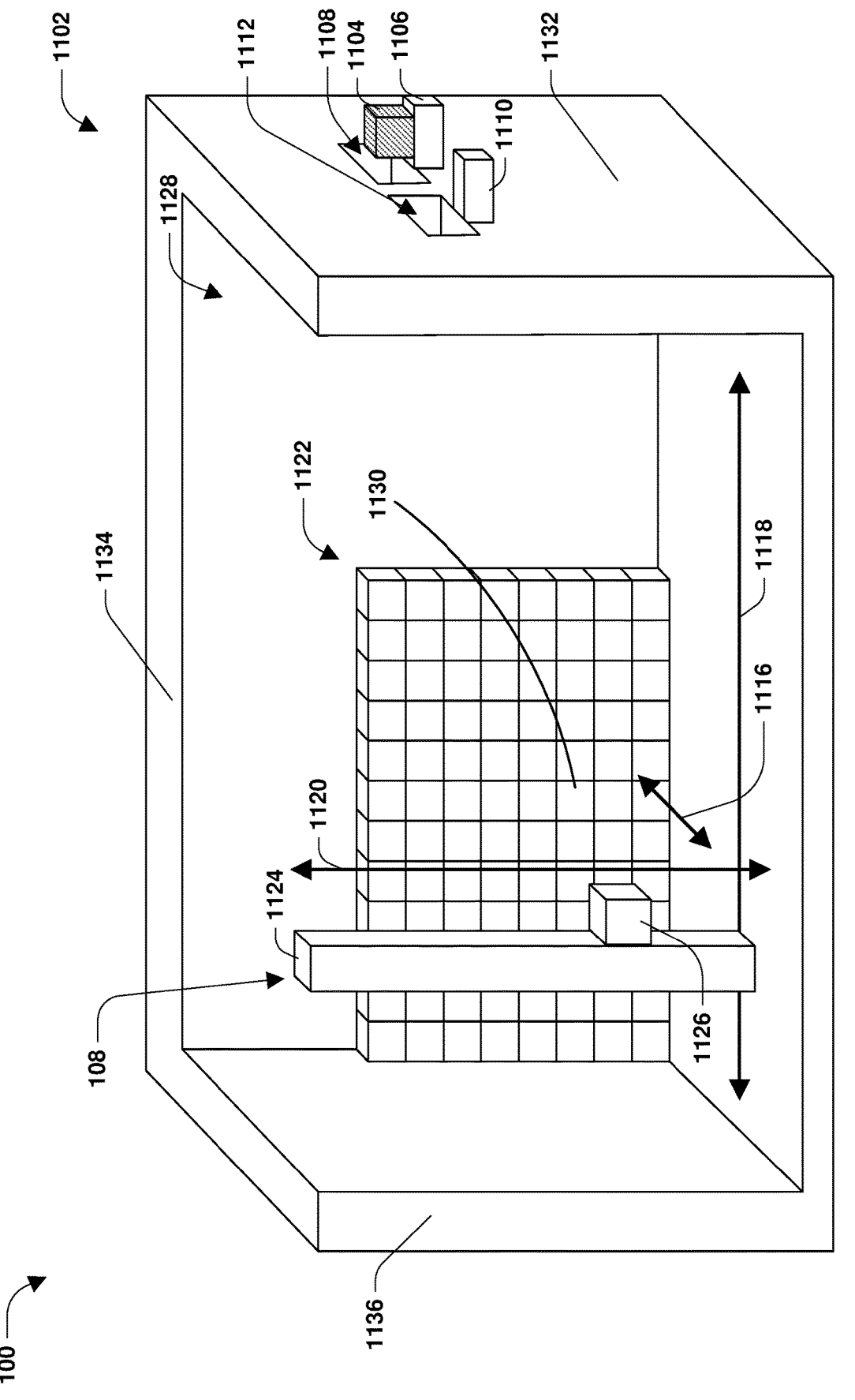
FIG. 11 illustrates a perspective view of a stocking vehicle, a first product unit, and a stocking system, in accordance with some embodiments.

FIG. 11 illustrates the stocking vehicle 108, the first product unit (shown with reference number 1104 in FIGS. 11-17), and a stocking system 1102 of the automated material handling system 100, in accordance with some embodiments. In some embodiments, the stocking system 1102 comprises a storage assembly 1122 comprising a plurality of storage locations for storing product units. In some embodiments, the stocking vehicle 108 comprises at least one of the crane 1124 or the arm 1126. In some embodiments, at least one of the crane 1124 or the arm 1126 corresponds to a stocking component used to transfer the first product unit from the first location to the second location via the first stocking operation. In some embodiments, each storage location of the plurality of storage locations of the storage assembly 1122 is configured for storage of a product unit, such as a wafer storage device. In some embodiments, the storage assembly 1122 comprises a shelving unit configured to support a product unit in a storage location of the plurality of storage locations. In some embodiments, the storage assembly 1122 is disposed in a stocking area 1128 of the stocking system 1102. In some embodiments, the stocking area 1128 is accessible to the stocking vehicle 108. In some embodiments, the stocking area 1128 is at least partially enclosed by at least one of a wall 1132, a wall 1134, a wall 1136, a ceiling (not shown), or one or more other structures.

In some embodiments, the stocking system 1102 comprises at least one of an input port 1106, an input opening 1108, an output port 1110, or an output opening 1112. In some embodiments, at least one of the input port 1106 or the input opening 1108 is used to transfer a product unit from outside the stocking area 1128 to inside the stocking area 1128. In some embodiments, at least one of the output port 1110 or the output opening 1112 is used to transfer a product unit from inside the stocking area 1128 to outside the stocking area 1128. In some embodiments, the first location of the first stocking operation corresponds to the input port 1106. In some embodiments, the second location of the first stocking operation corresponds to the first storage location 1130 of the storage assembly 1122. In some embodiments, the first stocking operation comprises transferring the first product unit 1104 from the input port 1106 to a first storage location 1130 of the storage assembly 1122. In some embodiments, prior to the first stocking operation, at least one of (i) the process machine is used to perform the first process on the one or more wafers stored in the first product unit, or (ii) the first product unit 1104 is transferred from the process machine to the input port 1106. In some embodiments, the first storage location 1130 is over a shelving unit (not shown). For the purpose of simplicity and clarity, shelving units of storage locations of the storage assembly 1122 are not shown in FIGS. 11-17.

Figure 12:
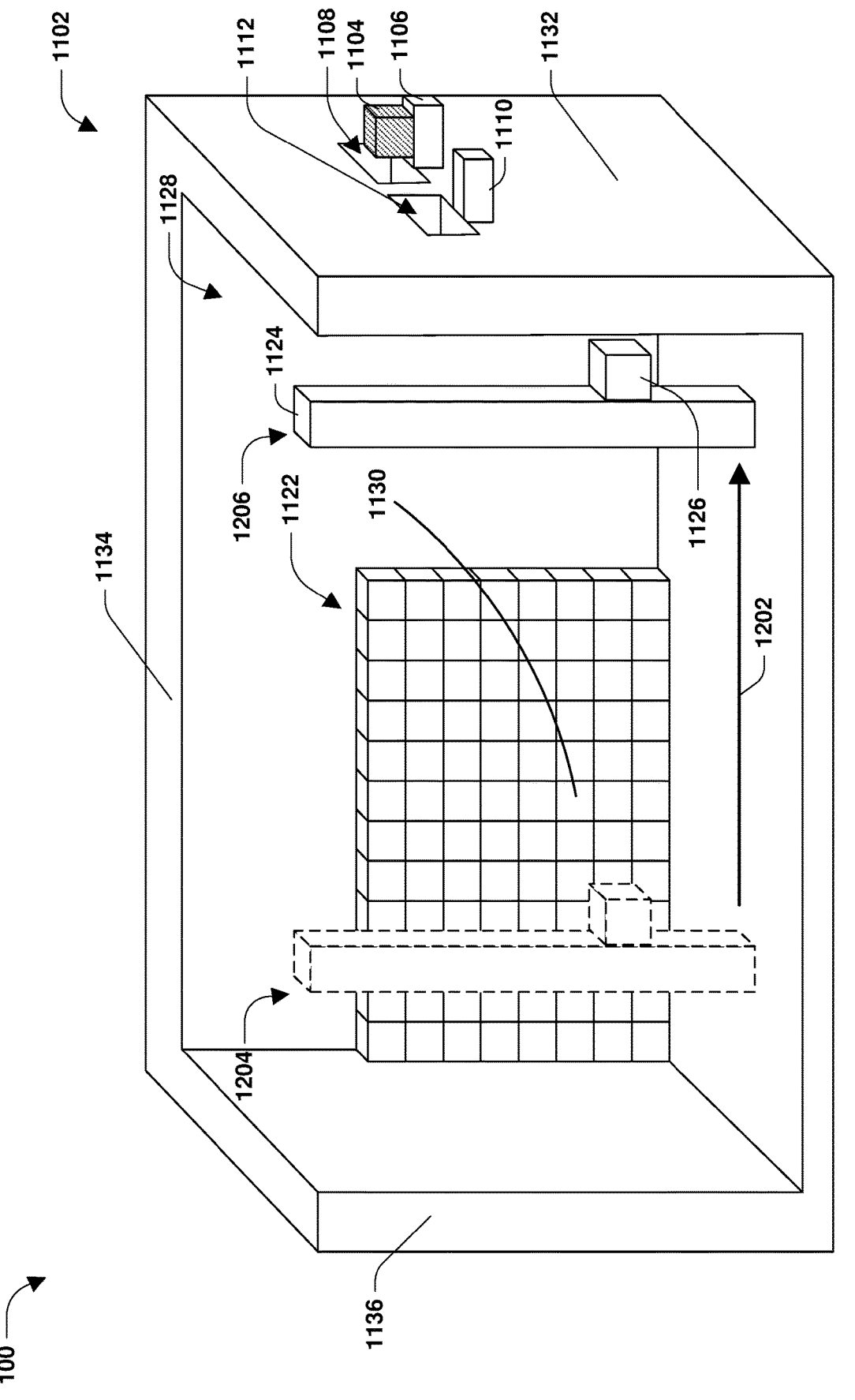
FIG. 12 illustrates a perspective view of a stocking vehicle, a first product unit, and a stocking system during a first movement operation of a first stocking operation, in accordance with some embodiments.
Figure 13:
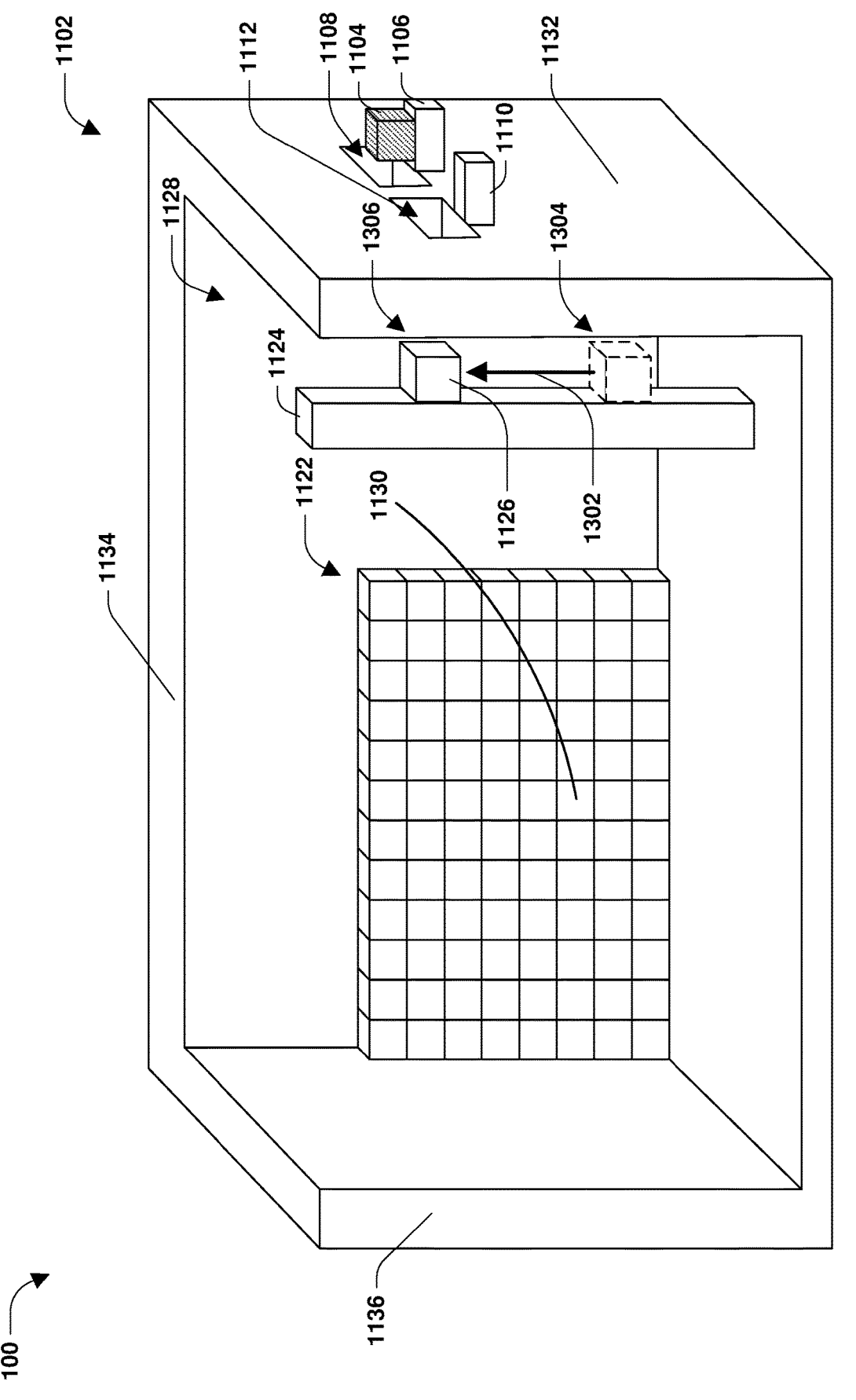
FIG. 13 illustrates a perspective view of a stocking vehicle, a first product unit, and a stocking system during a second movement operation of a first stocking operation, in accordance with some embodiments.
Figure 14:
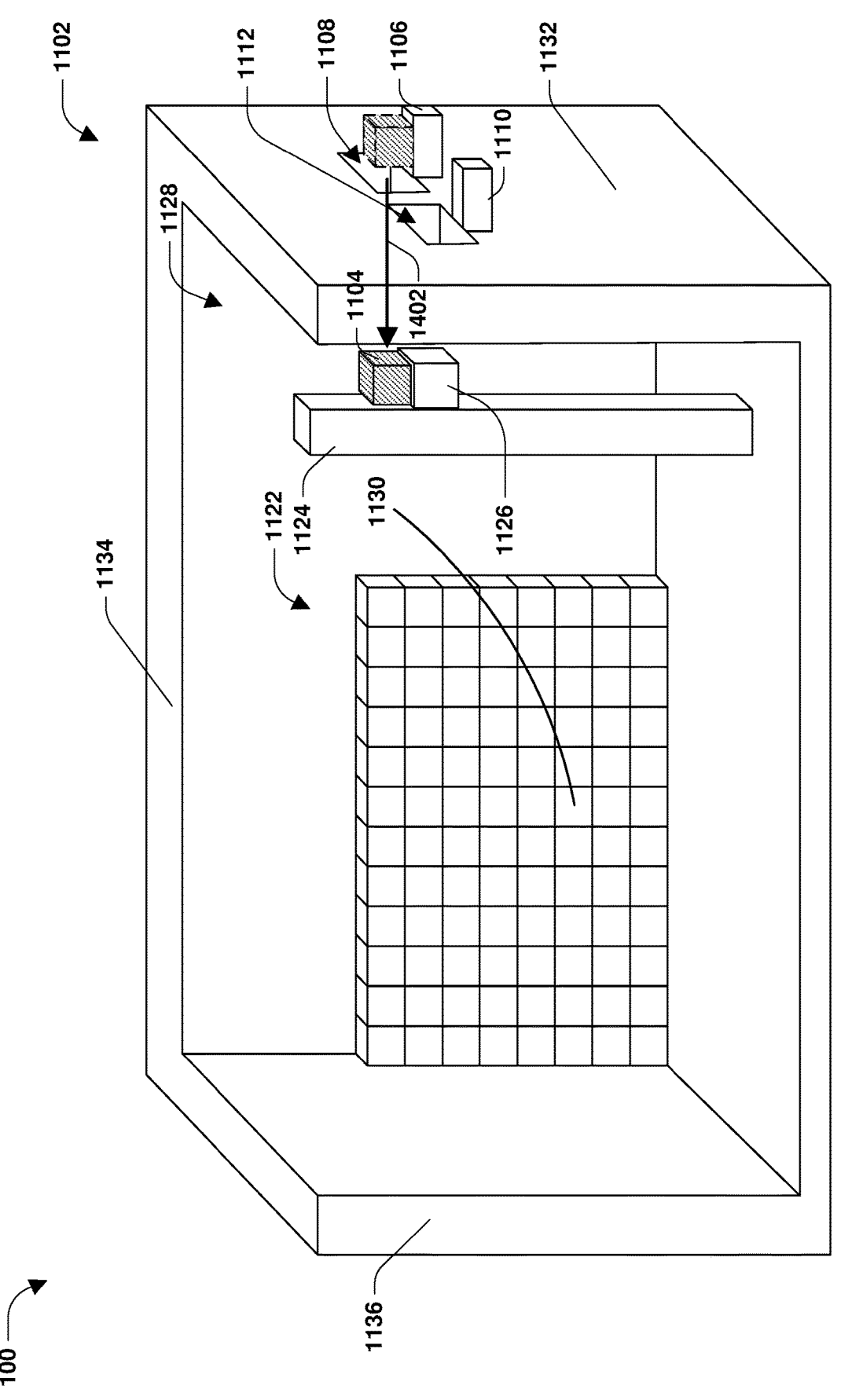
FIG. 14 illustrates a perspective view of a stocking vehicle, a first product unit, and a stocking system during a third movement operation of a first stocking operation, in accordance with some embodiments.
Figure 15:
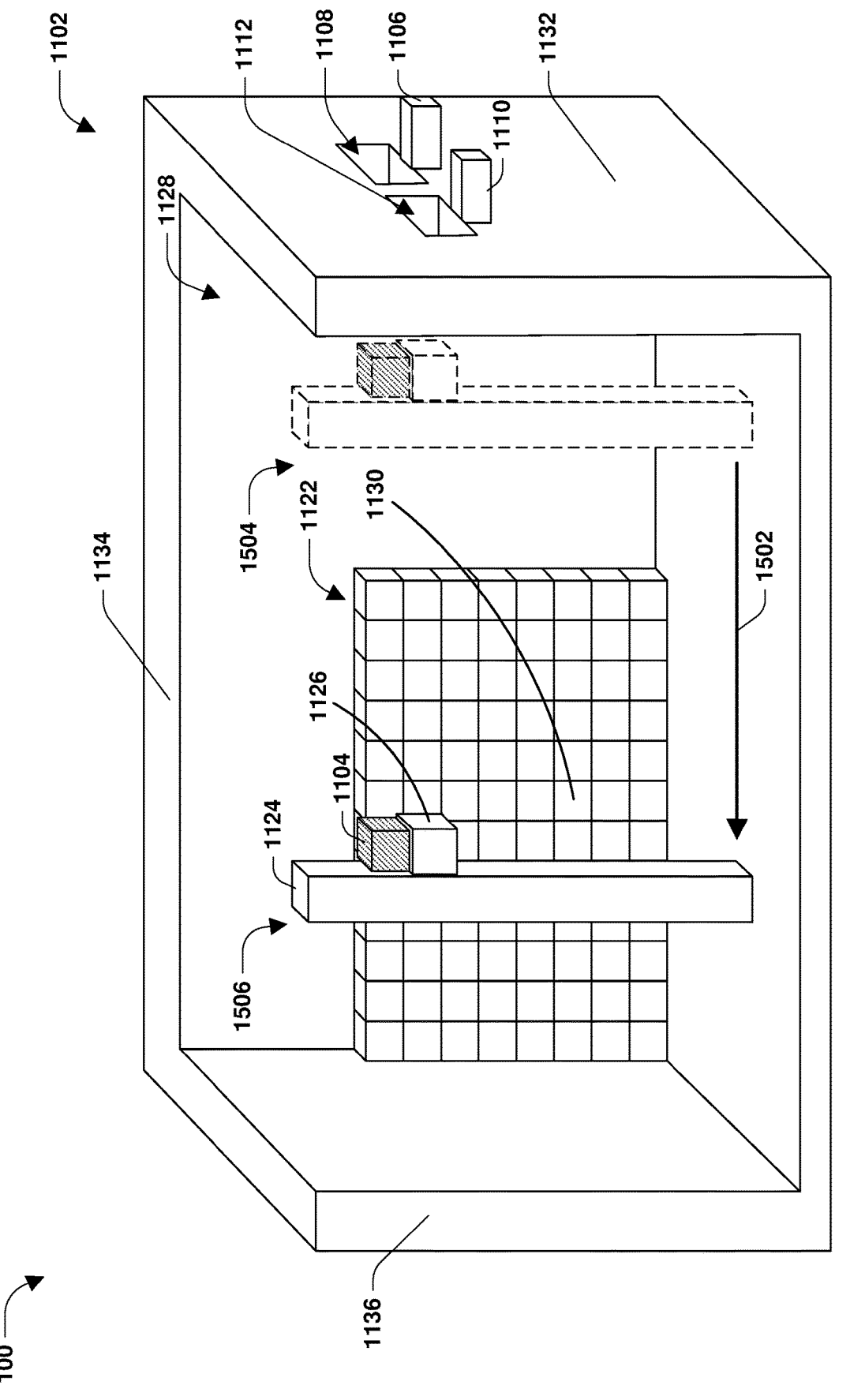
FIG. 15 illustrates a perspective view of a stocking vehicle, a first product unit, and a stocking system during a fourth movement operation of a first stocking operation, in accordance with some embodiments.
Figure 16:
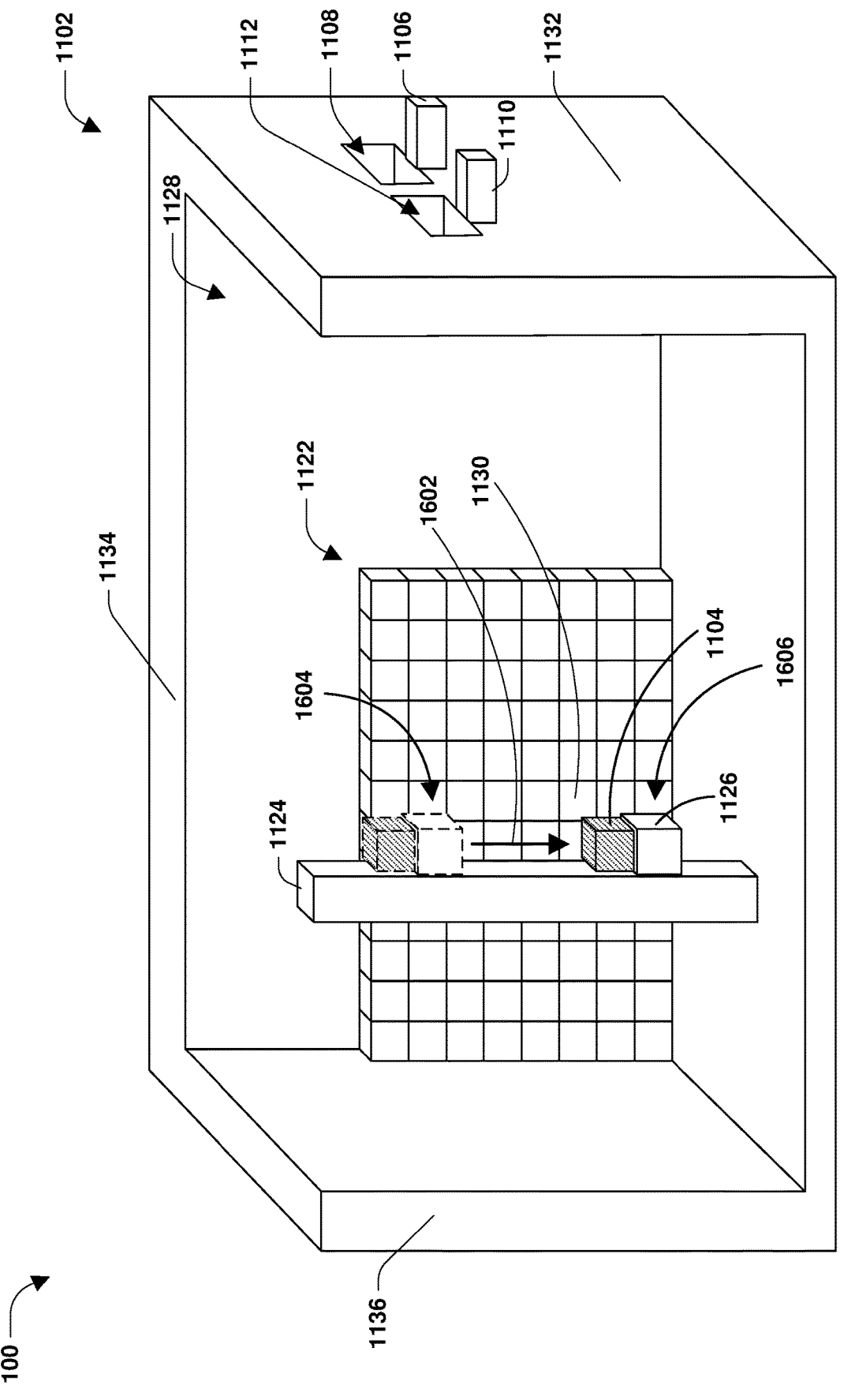
FIG. 16 illustrates a perspective view of a stocking vehicle, a first product unit, and a stocking system during a fifth movement operation of a first stocking operation, in accordance with some embodiments.
Figure 17:
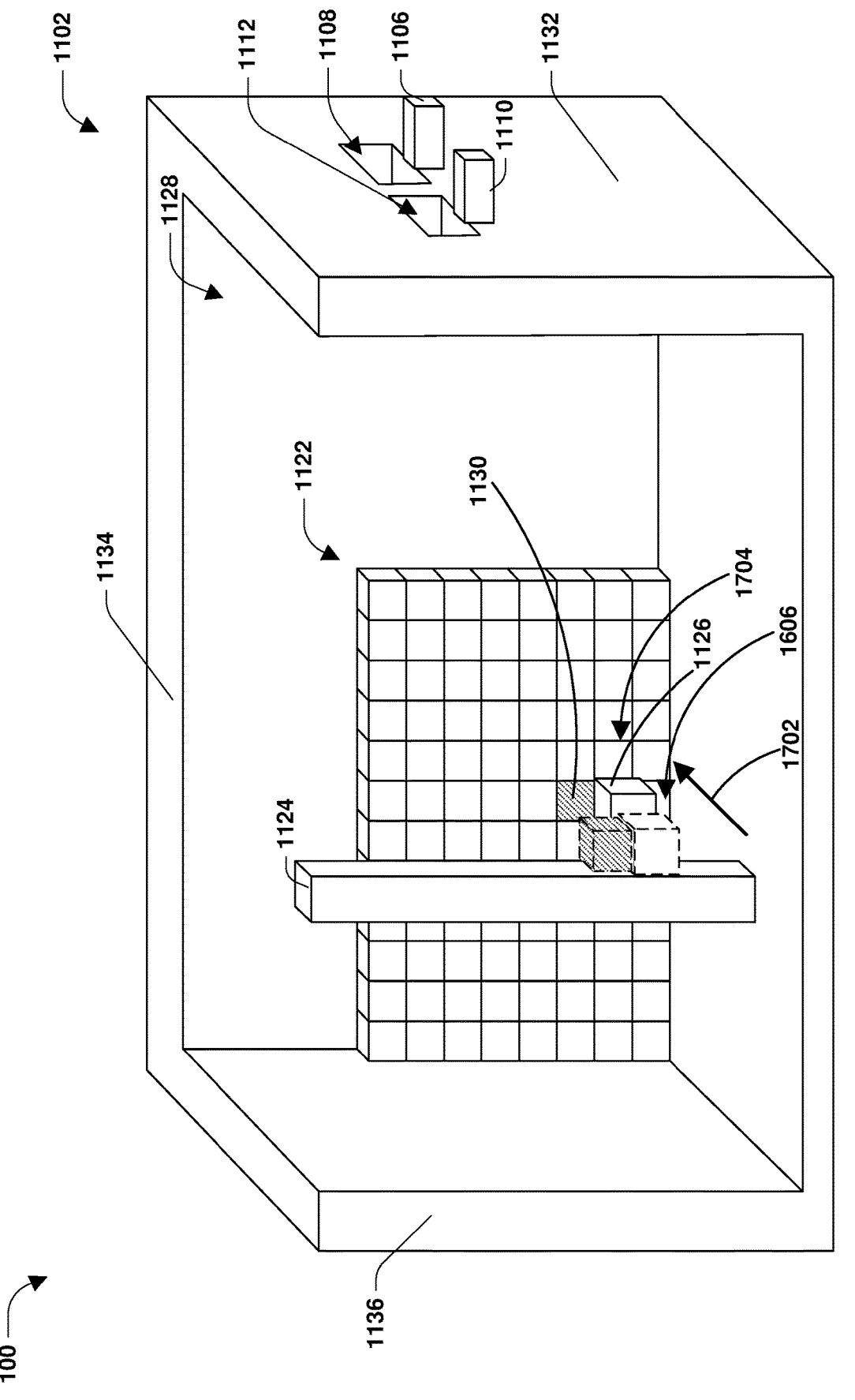
FIG. 17 illustrates a perspective view of a stocking vehicle, a first product unit, and a stocking system during a sixth movement operation of a first stocking operation, in accordance with some embodiments.

In some embodiments, the first stocking operation comprises at least one of a first movement operation illustrated in FIG. 12, a second movement operation illustrated in FIG. 13, a third movement operation illustrated in FIG. 14, a fourth movement operation illustrated in FIG. 15, a fifth movement operation illustrated in FIG. 16, or a sixth movement operation illustrated in FIG. 17. Other movement operations of the first stocking operation are within the scope of the present disclosure.

FIG. 12 illustrates the stocking vehicle 108 performing the first movement operation to move the crane 1124 from a first position 1204 to a second position 1206, in accordance with some embodiments. In some embodiments, the first movement operation comprises moving the crane 1124 in a first movement direction 1202 along the third axis 1118 (shown in FIGS. 11 and 19). In some embodiments, the first movement operation moves the arm 1126 in conjunction with the crane 1124, such as due, at least in part, to the arm 1126 being coupled to the crane 1124. In some embodiments, the first movement operation is performed using a track (not shown) that guides movement of the crane 1124 in the first movement direction 1202.

In some embodiments, the travel motor 1007 (shown in FIGS. 10A-10B) is activated to perform the first movement operation. In some embodiments, the first movement operation comprises at least one of (i) supplying energy 1016 (shown in FIG. 10A) from the energy storage device 106 to the travel motor 1007 while the travel motor 1007 is in the first state, wherein at least one of the travel motor 1007 uses the energy 1016 to displace the crane 1124 along the first movement direction 1202 or the energy 1016 powers the travel motor 1007 to accelerate the travel motor 1007 and/or increase a speed of movement of the crane 1124 along the first movement direction 1202, or (ii) harvesting energy 1036 (shown in FIG. 10B) from the travel motor 1007 while the travel motor 1007 is in the second state. In some embodiments, the energy 1036 is harvested from the travel motor 1007 via regenerative braking to slow down movement of the crane 1124 such that the crane 1124 at least one of stops at or does not move past the second position 1206. In some embodiments, a speed at which the travel motor 1007 operates during the first movement operation is at least one of determined or controlled using one or more of the techniques provided herein with respect to the first speed of the first motor 110. In some embodiments, the speed is based upon the stocking operation mode of the first stocking operation. In some embodiments, if the stocking operation mode of the first stocking operation is the second stocking operation mode 510, the energy 1016 supplied to the travel motor 1007 while the travel motor 1007 is in the first state is greater as compared to an embodiment in which the stocking operation mode of the first stocking operation is the first stocking operation mode 508. In some embodiments, if the stocking operation mode of the first stocking operation is the second stocking operation mode 510, the speed of the travel motor 1007 is greater as compared to an embodiment in which the stocking operation mode of the first stocking operation is the first stocking operation mode 508. In some embodiments, if the stocking operation mode of the first stocking operation is the second stocking operation mode 510, the first movement operation is performed more quickly as compared to an embodiment in which the stocking operation mode of the first stocking operation is the first stocking operation mode 508. In some embodiments, at least some of the energy 1036 harvested from the travel motor 1007 during a first time period of the first movement operation is used, in a second time period after the first time period, to power a motor of the stocking vehicle, such as at least one of the travel motor 1007, the arm motor 1003, or the lifter motor 1005. In some embodiments, at least some of the energy 1036 harvested from the travel motor 1007 during the first movement operation is used in a subsequent movement operation to power a motor of the stocking vehicle, such as at least one of the travel motor 1007, the arm motor 1003, or the lifter motor 1005. In some embodiments, the subsequent movement operation comprises at least one of the second movement operation, the third movement operation, the fourth movement operation, the fifth movement operation, or the sixth movement operation.

FIG. 13 illustrates the stocking vehicle 108 performing the second movement operation to move the arm 1126 from a third position 1304 to a fourth position 1306, in accordance with some embodiments. In some embodiments, the second movement operation comprises moving the arm 1126 in a second movement direction 1302 along the second axis 1120 (shown in FIGS. 11, 18, and 19).

In some embodiments, the lifter motor 1005 (shown in FIGS. 10A-10B) is activated to perform the second movement operation. In some embodiments, the second movement operation comprises at least one of (i) supplying energy 1014 (shown in FIG. 10A) from the energy storage device 106 to the lifter motor 1005 while the lifter motor 1005 is in the first state, wherein at least one of the lifter motor 1005 uses the energy 1014 to displace the arm 1126 along the second movement direction 1302 or the energy 1014 powers the lifter motor 1005 to accelerate the lifter motor 1005 and/or increase a speed of movement of the arm 1126 along the second movement direction 1302, or (ii) harvesting energy 1034 (shown in FIG. 10B) from the lifter motor 1005 while the lifter motor 1005 is in the second state. In some embodiments, the energy 1034 is harvested from the lifter motor 1005 via regenerative braking to slow down movement of the arm 1126 such that the arm 1126 at least one of stops at or does not move past the fourth position 1306. In some embodiments, a speed at which the lifter motor 1005 operates during the second movement operation is at least one of determined or controlled using one or more of the techniques provided herein with respect to the first speed of the first motor 110. In some embodiments, the speed is based upon the stocking operation mode of the first stocking operation. In some embodiments, if the stocking operation mode of the first stocking operation is the second stocking operation mode 510, the energy 1014 supplied to the lifter motor 1005 while the lifter motor 1005 is in the first state is greater as compared to an embodiment in which the stocking operation mode of the first stocking operation is the first stocking operation mode 508. In some embodiments, if the stocking operation mode of the first stocking operation is the second stocking operation mode 510, the speed of the lifter motor 1005 is greater as compared to an embodiment in which the stocking operation mode of the first stocking operation is the first stocking operation mode 508. In some embodiments, if the stocking operation mode of the first stocking operation is the second stocking operation mode 510, the second movement operation is performed more quickly as compared to an embodiment in which the stocking operation mode of the first stocking operation is the first stocking operation mode 508. In some embodiments, at least some of the energy 1034 harvested from the lifter motor 1005 during a third time period of the second movement operation is used, in a fourth time period after the third time period, to power a motor of the stocking vehicle, such as at least one of the travel motor 1007, the arm motor 1003, or the lifter motor 1005.

FIG. 14 illustrates performing the third movement operation to transfer 1402 the first product unit 1104 from the input port 1106 to the arm 1126, in accordance with some embodiments. In some embodiments, the first product unit 1104 is transferred 1402 from the input port 1106 to the arm 1126 using a first mechanical device (not shown). In some embodiments, the first mechanical device transfers the first product unit 1104 through the input opening 1108 to the arm 1126. In some embodiments, the stocking vehicle 108 comprises the first mechanical device. In some embodiments, the stocking vehicle 108 does not comprise the first mechanical device. In some embodiments, the stocking system 1102 comprises the first mechanical device.

FIG. 15 illustrates the stocking vehicle 108 performing the fourth movement operation to move the crane 1124 from a fifth position 1504 to a sixth position 1506, in accordance with some embodiments. In some embodiments, the fifth position 1504 of the crane 1124 is the same as the second position 1206 of the crane 1124. In some embodiments, the fourth movement operation comprises moving the crane 1124 in a third movement direction 1502 along the third axis 1118 (shown in FIGS. 11 and 19). In some embodiments, the fourth movement operation moves the arm 1126 and the first product unit 1104 in conjunction with the crane 1124, such as due, at least in part, to at least one of the arm 1126 being coupled to the crane 1124 or the first product unit 1104 being supported by the arm 1126. In some embodiments, the fourth movement operation is performed using a track (not shown) that guides movement of the crane 1124 in the third movement direction 1502.

In some embodiments, the travel motor 1007 (shown in FIGS. 10A-10B) is activated to perform the fourth movement operation. In some embodiments, the fourth movement operation comprises at least one of (i) supplying energy 1016 (shown in FIG. 10A) from the energy storage device 106 to the travel motor 1007 while the travel motor 1007 is in the first state, wherein at least one of the travel motor 1007 uses the energy 1016 to displace the crane 1124 along the third movement direction 1502 or the energy 1016 powers the travel motor 1007 to accelerate the travel motor 1007 and/or increase a speed of movement of the crane 1124 along the third movement direction 1502, or (ii) harvesting energy 1036 (shown in FIG. 10B) from the travel motor 1007 while the travel motor 1007 is in the second state. In some embodiments, the energy 1036 is harvested from the travel motor 1007 via regenerative braking to slow down movement of the crane 1124 such that the crane 1124 at least one of stops at or does not move past the sixth position 1506. In some embodiments, a speed at which the travel motor 1007 operates during the fourth movement operation is at least one of determined or controlled using one or more of the techniques provided herein with respect to the first speed of the first motor 110. In some embodiments, the speed is based upon the stocking operation mode of the first stocking operation. In some embodiments, if the stocking operation mode of the first stocking operation is the second stocking operation mode 510, the fourth movement operation is performed more quickly as compared to an embodiment in which the stocking operation mode of the first stocking operation is the first stocking operation mode 508. In some embodiments, at least some of the energy 1036 harvested from the travel motor 1007 during a fifth time period of the fourth movement operation is used, in a sixth time period after the fifth time period, to power a motor of the stocking vehicle, such as at least one of the travel motor 1007, the arm motor 1003, or the lifter motor 1005.

FIG. 16 illustrates the stocking vehicle 108 performing the fifth movement operation to move the arm 1126 from a seventh position 1604 to an eighth position 1606, in accordance with some embodiments. In some embodiments, the fifth movement operation comprises moving the arm 1126 in a fourth movement direction 1602 along the second axis 1120 (shown in FIGS. 11, 18, and 19). In some embodiments, the fifth movement operation moves the first product unit 1104 in conjunction with the arm 1126, such as due, at least in part, to the first product unit 1104 being supported by the arm 1126.

In some embodiments, the lifter motor 1005 (shown in FIGS. 10A-10B) is activated to perform the fifth movement operation. In some embodiments, the fifth movement operation comprises at least one of (i) supplying energy 1014 (shown in FIG. 10A) from the energy storage device 106 to the lifter motor 1005 while the lifter motor 1005 is in the first state, wherein at least one of the lifter motor 1005 uses the energy 1014 to displace the arm 1126 along the fourth movement direction 1602 or the energy 1014 powers the lifter motor 1005 to accelerate the lifter motor 1005 and/or increase a speed of movement of the arm 1126 along the fourth movement direction 1602, or (ii) harvesting energy 1034 (shown in FIG. 10B) from the lifter motor 1005 while the lifter motor 1005 is in the second state. In some embodiments, the energy 1034 is harvested from the lifter motor 1005 via regenerative braking to slow down movement of the arm 1126 such that the arm 1126 at least one of stops at or does not move past the eighth position 1606. In some embodiments, a speed at which the lifter motor 1005 operates during the fifth movement operation is at least one of determined or controlled using one or more of the techniques provided herein with respect to the first speed of the first motor 110. In some embodiments, the speed is based upon the stocking operation mode of the first stocking operation. In some embodiments, if the stocking operation mode of the first stocking operation is the second stocking operation mode 510, the energy 1014 supplied to the lifter motor 1005 while the lifter motor 1005 is in the first state is greater as compared to an embodiment in which the stocking operation mode of the first stocking operation is the first stocking operation mode 508. In some embodiments, if the stocking operation mode of the first stocking operation is the second stocking operation mode 510, the speed of the lifter motor 1005 is greater as compared to an embodiment in which the stocking operation mode of the first stocking operation is the first stocking operation mode 508. In some embodiments, if the stocking operation mode of the first stocking operation is the second stocking operation mode 510, the fifth movement operation is performed more quickly as compared to an embodiment in which the stocking operation mode of the first stocking operation is the first stocking operation mode 508. In some embodiments, at least some of the energy 1034 harvested from the lifter motor 1005 during a seventh time period of the fifth movement operation is used, in an eighth time period after the seventh time period, to power a motor of the stocking vehicle, such as at least one of the travel motor 1007, the arm motor 1003, or the lifter motor 1005.

FIG. 17 illustrates the stocking vehicle 108 performing the sixth movement operation to move the arm 1126 from the eighth position 1606 to a ninth position 1704, in accordance with some embodiments. In some embodiments, the sixth movement operation comprises moving the arm 1126 in a fifth movement direction 1702 along the first axis 1116 (shown in FIGS. 11, 18, and 19). In some embodiments, the sixth movement operation moves the first product unit 1104 in conjunction with the arm 1126, such as due, at least in part, to the first product unit 1104 being supported by the arm 1126. In some embodiments, in response to performing the sixth movement operation, the first product unit 1104 is transferred from the arm 1126 to the first storage location 1130. In some embodiments, the first product unit 1104 is transferred from the arm 1126 to the first storage location 1130 using a second mechanical device (not shown). In some embodiments, the stocking vehicle 108 comprises the second mechanical device. In some embodiments, the stocking vehicle 108 does not comprise the second mechanical device. In some embodiments, at least one of the stocking system 1102 or the storage assembly 1122 comprises the second mechanical device.

In some embodiments, the arm motor 1003 (shown in FIGS. 10A-10B) is activated to perform the sixth movement operation. In some embodiments, the sixth movement operation comprises at least one of (i) supplying energy 1012 (shown in FIG. 10A) from the energy storage device 106 to the arm motor 1003 while the arm motor 1003 is in the first state, wherein at least one of the arm motor 1003 uses the energy 1012 to displace the arm 1126 along the fifth movement direction 1702 or the energy 1012 powers the arm motor 1003 to accelerate the arm motor 1003 and/or increase a speed of movement of the arm 1126 along the fifth movement direction 1702, or (ii) harvesting energy 1032 (shown in FIG. 10B) from the arm motor 1003 while the arm motor 1003 is in the second state. In some embodiments, the energy 1032 is harvested from the arm motor 1003 via regenerative braking to slow down movement of the arm 1126 such that the arm 1126 at least one of stops at or does not move past the ninth position 1704. In some embodiments, a speed at which the arm motor 1003 operates during the sixth movement operation is at least one of determined or controlled using one or more of the techniques provided herein with respect to the first speed of the first motor 110. In some embodiments, the speed is based upon the stocking operation mode of the first stocking operation. In some embodiments, if the stocking operation mode of the first stocking operation is the second stocking operation mode 510, the energy 1012 supplied to the arm motor 1003 while the arm motor 1003 is in the first state is greater as compared to an embodiment in which the stocking operation mode of the first stocking operation is the first stocking operation mode 508. In some embodiments, if the stocking operation mode of the first stocking operation is the second stocking operation mode 510, the speed of the arm motor 1003 is greater as compared to an embodiment in which the stocking operation mode of the first stocking operation is the first stocking operation mode 508. In some embodiments, if the stocking operation mode of the first stocking operation is the second stocking operation mode 510, the sixth movement operation is performed more quickly as compared to an embodiment in which the stocking operation mode of the first stocking operation is the first stocking operation mode 508. In some embodiments, at least some of the energy 1032 harvested from the arm motor 1003 during a ninth time period of the sixth movement operation is used, in a tenth time period after the ninth time period, to power a motor of the stocking vehicle, such as at least one of the travel motor 1007, the arm motor 1003, or the lifter motor 1005.

Embodiments are contemplated in which the first stocking operation comprises transferring the first product unit 1104 from a storage location, such as the first storage location 1130, to the output port 1110. In some embodiments, subsequent to the first stocking operation, at least one of (i) the first product unit 1104 is transferred from the output port 1110 to the process machine, or (ii) the process machine is used to perform the first process on the one or more wafers stored in the first product unit. Other embodiments of the first stocking operation other than those shown in FIGS. 11-17 are within the scope of the present disclosure.

Figure 18:
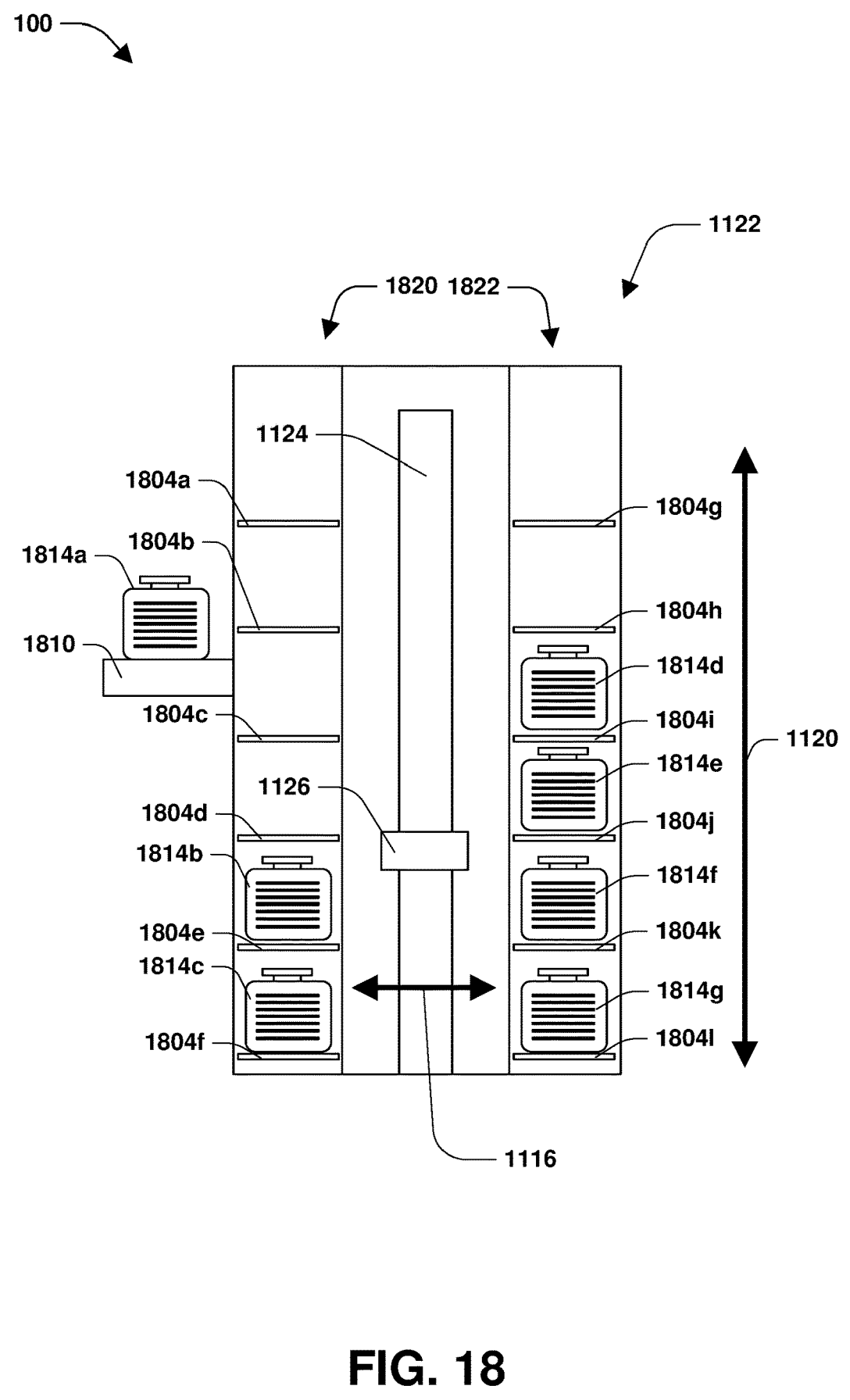

FIG. 18 illustrates a side view of the storage assembly 1122, the crane 1124, and the arm 1126, in accordance with some embodiments. In some embodiments, the storage assembly 1122 of the stocking system 1102 comprises a first set of shelving units 1820 and a second set of shelving units 1822. In some embodiments, at least one of the crane 1124, the arm 1126, or one or more other stocking components of the stocking vehicle 108 is between the first set of shelving units 1820 and the second set of shelving units 1822. In some embodiments, the first set of shelving units 1820 comprise shelving units 1804*a*, 1804*b*, 1804*c*, 1804*d*, 1804*e*, and/or 1804*f*. In some embodiments, the second set of shelving units 1822 comprise shelving units 1804*g*, 1804*h*, 1804*i*, 1804*j*, 1804*k* and 1804*l*. In some embodiments, the second set of shelving units 1822 comprise shelving units 1804*g*, 1804*h*, 1804*i*, 1804*j*, 1804*k* and/or 1804*l*. In some embodiments, a product unit 1814*a* is disposed on a port 1810, such as at least one of the input port 1106, the output port 1110, or other port. In some embodiments, product units 1814*b*, 1814*c*, 1814*d*, 1814*e*, 1814*f* and 1814*g* are stored in storage locations over shelving units 1804*e*, 1804*f*, 1804*i*, 1804*j*, 1804*k* and 1804*l*, respectively.

Figure 19:
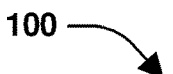
FIG. 19 illustrates a perspective view of a crane and an arm, in accordance with some embodiments.

FIG. 19 illustrates a perspective view of the crane 1124 and the arm 1126, according to some embodiments. The first axis 1116, the second axis 1120, and the third axis 1118 are apparent in FIG. 19, in accordance with some embodiments.

Figure 20:
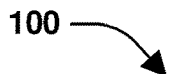
FIG. 20 illustrates a perspective view of a storage assembly, in accordance with some embodiments.
Figure 20:
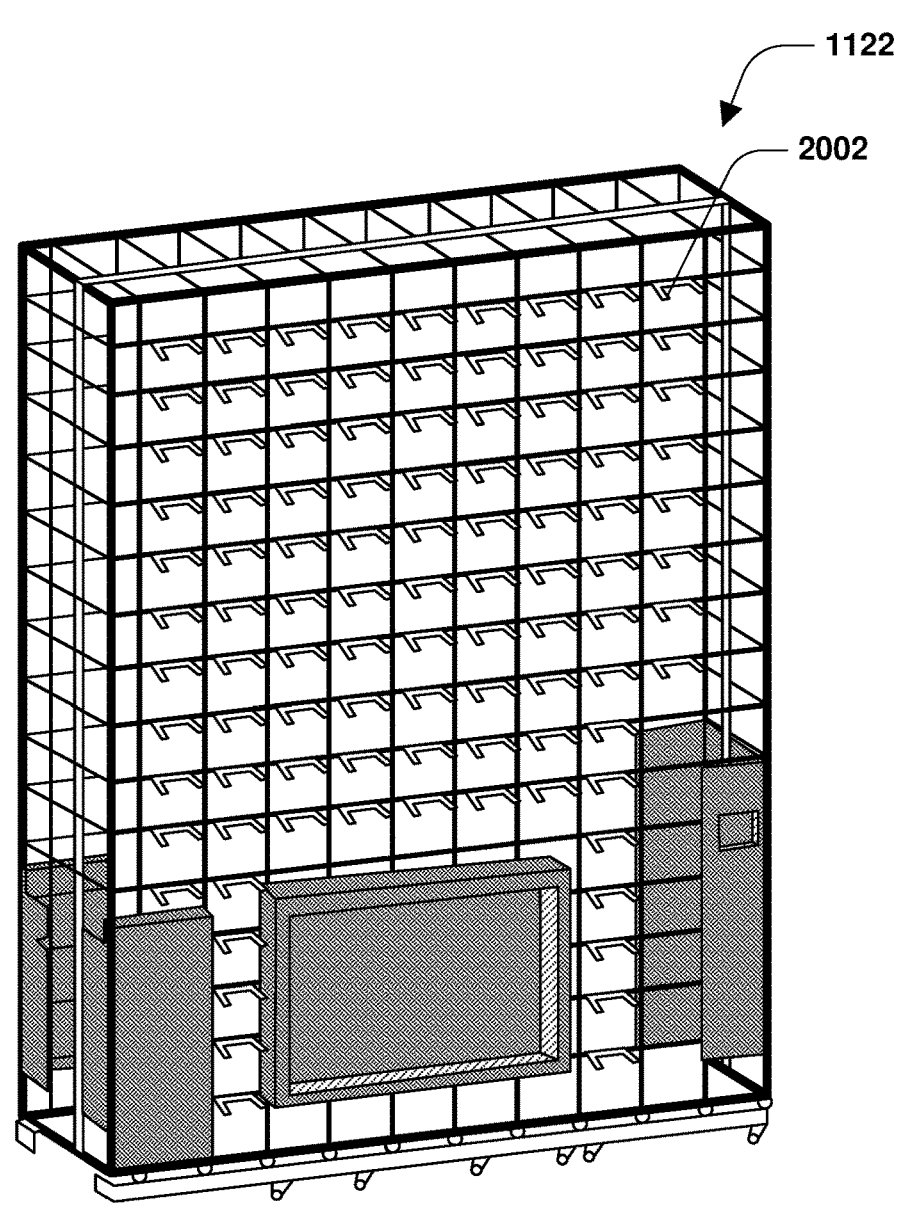

FIG. 20 illustrates a perspective view of the storage assembly 1122, according to some embodiments. Shelving units of the storage assembly 1122 include a shelving unit 2002 and other shelving units, in accordance with some embodiments.

Other embodiments of the stocking system 1102, the storage assembly 1122, the crane 1124, and/or the arm 1126 other than those shown in FIGS. 11-20 are within the scope of the present disclosure.

Figure 21:
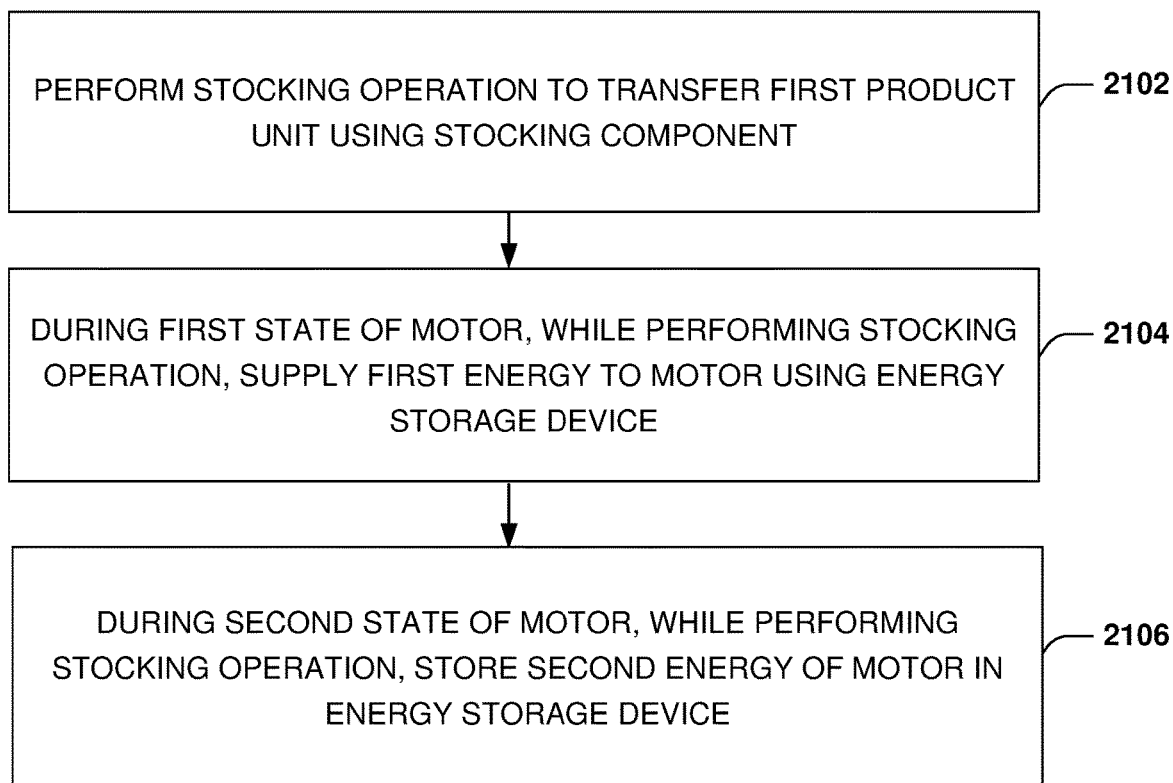
FIG. 21 is a flow diagram illustrating a method, in accordance with some embodiments.

A method 2100 of operating a stocking vehicle comprising a stocking component, a motor coupled to the stocking component, and an energy storage device is illustrated in FIG. 21 in accordance with some embodiments. In some embodiments, the stocking vehicle comprises the stocking vehicle 108. In some embodiments, the motor comprises at least one of the first motor 110, the arm motor 1003, the lifter motor 1005, or the travel motor 1007. At 2102, a stocking operation is performed to transfer a first product unit using the stocking component. At 2104, during a first state of the motor and while performing the stocking operation, first energy is supplied to the motor using the energy storage device. At 2106, during a second state of the motor and while performing the stocking operation, second energy of the motor is stored in the energy storage device.

A method 2200 of operating a stocking vehicle comprising an arm, a motor coupled to the arm, and an energy storage device is illustrated in FIG. 22 in accordance with some embodiments. In some embodiments, the stocking vehicle comprises the stocking vehicle 108. In some embodiments, the motor comprises at least one of the first motor 110, the arm motor 1003, the lifter motor 1005, or the travel motor 1007. At 2202, first energy is supplied to the motor while the motor is in a first state. The motor, in the first state, moves the arm to transfer a first product unit, supported by the arm, from a first location to a second location. In some embodiments, the first energy is supplied by the energy storage device. At 2204, second energy of the motor is harvested using the energy storage device while the motor is in a second state.

In some embodiments, the movement of the first product unit from the first location to the second location corresponds to movement of the first product unit during at least one of the fifth movement operation shown in FIG. 16, the sixth movement operation shown in FIG. 17, or other movement operation in which the arm 1126 is moved using at least one of the arm motor 1003, the lifter motor 1005, or other motor coupled to the arm 1126.

In some embodiments, act 2204 of the method 2200 comprises (i) converting, using a boost converter, energy generated by the motor to the second energy, and (ii) storing the second energy in the energy storage device.

In some embodiments, act 2204 of the method 2200 comprises decelerating the motor via regenerative braking.

Figure 23:
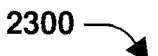
FIG. 23 illustrates an example computer-readable medium wherein processor-executable instructions configured to embody one or more of the provisions set forth herein may be comprised, according to some embodiments.
Figure 23:
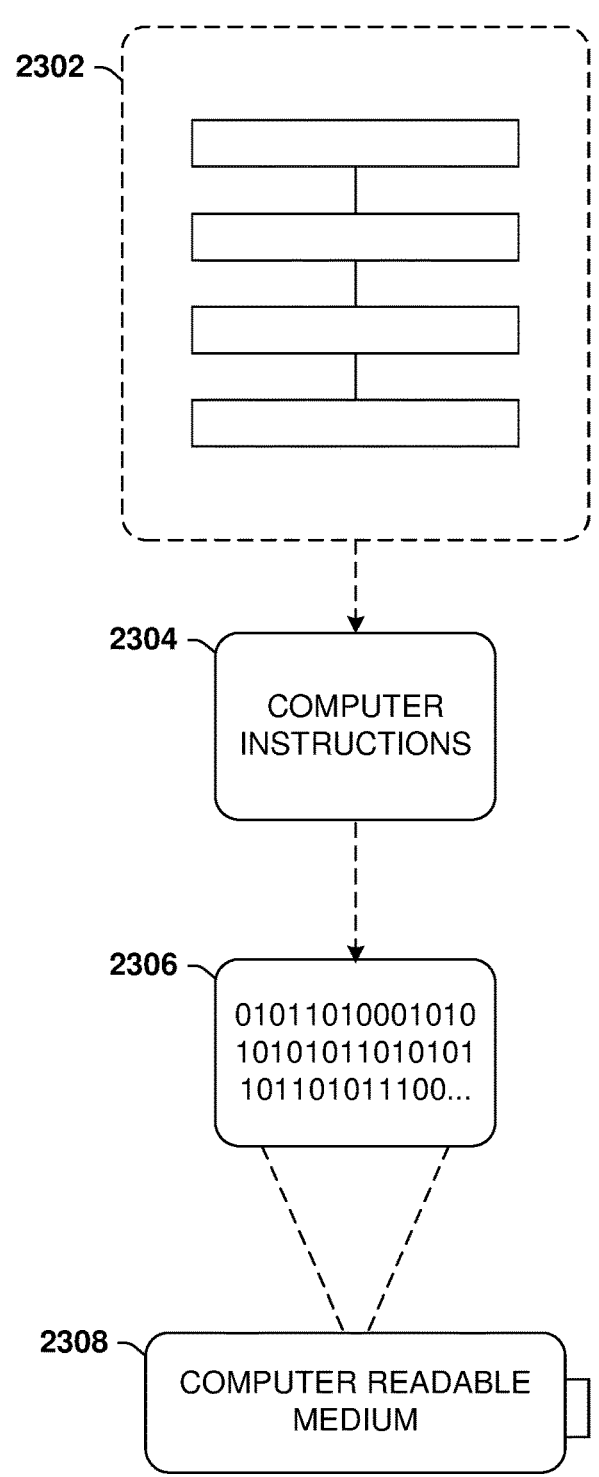

One or more embodiments involve a computer-readable medium comprising processor-executable instructions configured to implement one or more of the techniques presented herein. An exemplary computer-readable medium is illustrated in FIG. 23, wherein the embodiment 2300 comprises a computer-readable medium 2308 (e.g., a CD-R, DVD-R, flash drive, a platter of a hard disk drive, etc.), on which is encoded computer-readable data 2306. This computer-readable data 2306 in turn comprises a set of processor-executable computer instructions 2304 configured to implement one or more of the principles set forth herein when executed by a processor. In some embodiments 2300, the processor-executable computer instructions 2304 are configured to implement a method 2302, such as at least some of the aforementioned method(s) when executed by a processor. In some embodiments, the processor-executable computer instructions 2304 are configured to implement a system, such as at least some of the one or more aforementioned systems when executed by a processor. In some embodiments, the processor-executable computer instructions 2304 are configured to implement an apparatus, such as at least some of the one or more aforementioned apparatuses when executed by a processor. Many such computer-readable media may be devised by those of ordinary skill in the art that are configured to operate in accordance with the techniques presented herein.

In some embodiments, a stocking vehicle is provided. The stocking vehicle is configured to perform a stocking operation to transfer a first product unit from a first location to a second location. The stocking vehicle includes a stocking component. The stocking vehicle includes a motor coupled to the stocking component to facilitate performance of the stocking operation by the stocking component. The stocking vehicle includes an energy storage device configured to supply first energy to the motor during a first state of the motor and store second energy of the motor during a second state of the motor.

In some embodiments, a method of operating a stocking vehicle including a stocking component, a motor coupled to the stocking component, and an energy storage device is provided. The method includes performing a stocking operation to transfer a first product unit using the stocking component. The method includes during a first state of the motor, while performing the stocking operation, supplying first energy to the motor using the energy storage device. The method includes during a second state of the motor, while performing the stocking operation, storing second energy of the motor in the energy storage device.

In some embodiments, a method of operating a stocking vehicle including an arm, a motor coupled to the arm, and an energy storage device is provided. The method includes supplying first energy to the motor while the motor is in a first state. The motor, in the first state, moves the arm to transfer a first product unit, supported by the arm, from a first location to a second location. The method includes harvesting, using the energy storage device, second energy of the motor while the motor is in a second state.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

It will be appreciated that layers, features, elements, etc. depicted herein are illustrated with particular dimensions relative to one another, such as structural dimensions or orientations, for example, for purposes of simplicity and ease of understanding and that actual dimensions of the same differ substantially from that illustrated herein, in some embodiments. Additionally, a variety of techniques exist for forming layers, regions, features, elements, etc. mentioned herein, such as at least one of etching techniques, planarization techniques, implanting techniques, doping techniques, spin-on techniques, sputtering techniques, growth techniques, or deposition techniques such as chemical vapor deposition (CVD), for example.

Moreover, "exemplary" and/or the like is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A stocking vehicle configured to perform a stocking operation to transfer a first product unit from a first location to a second location, the stocking vehicle comprising:
   a stocking component;
   a motor coupled to the stocking component to facilitate performance of the stocking operation by the stocking component;
   an energy storage device configured to:
      supply first energy to the motor during a first state of the motor; and
      store second energy of the motor during a second state of the motor;
   a switch comprising a first node connected to the energy storage device and a second node connected to the motor; and
   a controller configured to:
      control the switch to be in an open state based upon the stocking vehicle being in an idle state; and
      control the switch to be in a closed state based upon the stocking vehicle not being in the idle state.

2. The stocking vehicle of claim 1, wherein:
   the first state corresponds to an acceleration state during which the motor accelerates.

3. The stocking vehicle of claim 1, wherein:
   the second state corresponds to a deceleration state during which the motor decelerates.

4. The stocking vehicle of claim 1, comprising:
   a boost converter configured to convert energy generated by the motor to the second energy.

5. The stocking vehicle of claim 1, wherein:
   the stocking component comprises an arm configured to support the first product unit; and
   the motor controls a position of the arm.

6. The stocking vehicle of claim 1, comprising:
   a second motor coupled to the stocking component, wherein:
      the stocking component comprises an arm configured to support the first product unit;
      the motor is configured to move the arm along a first axis; and
      the second motor is configured to move the arm along a second axis different than the first axis.

7. The stocking vehicle of claim 6, wherein:
   the energy storage device is configured to:
      supply third energy to the second motor during a third state of the second motor; and
      store fourth energy of the second motor during a fourth state of the second motor.

8. The stocking vehicle of claim 6, wherein:
   the first axis is a vertical axis; and
   the second axis is perpendicular to the first axis.

9. The stocking vehicle of claim 1, wherein:
   the stocking component comprises a crane; and
   the motor controls a position of the crane.

10. The stocking vehicle of claim 1, wherein:

the first location or the second location corresponds to a storage location over a shelving unit.

11. The stocking vehicle of claim 1, wherein:

the first product unit comprises a first wafer storage device.

12. The stocking vehicle of claim 1, wherein the controller is configured to control a speed of the motor based upon at least one of a priority of the first product unit or a processing time parameter of the first product unit.

13. A method of operating a stocking vehicle comprising a stocking component, a motor coupled to the stocking component, and an energy storage device, the method comprising:

performing a stocking operation to transfer a first product unit using the stocking component, wherein performing the stocking operation comprises:

determining an urgency score associated with the first product unit; and setting a speed of the motor based upon the urgency score;

during a first state of the motor, while performing the stocking operation, supplying first energy to the motor using the energy storage device according to the speed set for the motor; and during a second state of the motor, while performing the stocking operation, storing second energy of the motor in the energy storage device.

14. The method of claim 13, comprising:

converting, using a boost converter of the stocking vehicle, energy generated by the motor to the second energy.

15. The method of claim 13, wherein:

the first state corresponds to an acceleration state during which the motor accelerates; and the second state corresponds to a deceleration state during which the motor decelerates.

16. The method of claim 13, wherein performing the stocking operation comprises:

receiving information pertaining to the first product unit to be transferred, wherein determining the urgency score comprises determining the urgency score based upon the information; and comparing the urgency score to a threshold urgency score, wherein:

setting the speed of the first motor comprises:

when the urgency score is greater the threshold urgency score, setting the speed of the motor at a first value; and when the urgency score is less than or equal to the threshold urgency score, setting the speed of the motor at a second value different than the first value, and supplying the first energy to the motor using the energy storage device according to the speed set for the motor comprises:

supplying the first energy to the motor using the energy storage device when the speed set for the motor is the first value and supplying third energy to the motor using the energy storage device when the speed set for the motor is the second value.

17. A method of operating a stocking vehicle comprising an arm, a motor coupled to the arm, and an energy storage device, the method comprising:

supplying first energy to the motor while the motor is in a first state, wherein the motor, in the first state, moves the arm to transfer a first product unit, supported by the arm, from an input port protruding from an outer surface of a wall of a stocking area, through an opening defined in the wall of the stocking area toward an inner surface of the wall and to a location disposed within the stocking area; and harvesting, using the energy storage device, second energy of the motor while the motor is in a second state.

18. The method of claim 17, wherein harvesting the second energy comprises:

converting, using a boost converter, energy generated by the motor to the second energy; and storing the second energy in the energy storage device.

19. The method of claim 17, wherein harvesting the second energy comprises:

decelerating the motor via regenerative braking.

20. The method of claim 17, comprising:

receiving information pertaining to the first product unit to be transferred;

determining an urgency score associated with the first product unit based upon the information;

comparing the urgency score to a threshold urgency score;

when the urgency score is greater the threshold urgency score, setting a speed of the motor at a first value; and when the urgency score is less than or equal to the threshold urgency score, setting the speed of the motor at a second value different than the first value.

* * * * *